(12) United States Patent
Kaga et al.

(10) Patent No.: US 8,405,493 B2
(45) Date of Patent: Mar. 26, 2013

(54) APPARATUS FOR EMBEDDING WIRELESS IC TAGS

(75) Inventors: Kikuo Kaga, Tokyo (JP); Shigeo Ashizawa, Tokyo (JP)

(73) Assignee: Mitomo Corporation, Kanagawa (JP)

( * ) Notice: Subject to any disclaimer, the term of this patent is extended or adjusted under 35 U.S.C. 154(b) by 0 days.

(21) Appl. No.: 13/376,409

(22) PCT Filed: Jul. 23, 2010

(86) PCT No.: PCT/JP2010/062863
§ 371 (c)(1),
(2), (4) Date: Dec. 6, 2011

(87) PCT Pub. No.: WO2011/155080
PCT Pub. Date: Dec. 15, 2011

(65) Prior Publication Data
US 2012/0098648 A1    Apr. 26, 2012

(30) Foreign Application Priority Data
Jun. 9, 2010    (JP) .................................. 2010-132489

(51) Int. Cl.
*G06K 7/01*    (2006.01)
(52) U.S. Cl. ..................... 340/435; 340/10.51; 340/988; 222/196; 222/197; 222/199
(58) Field of Classification Search ............... 340/10.51, 340/905, 435, 438, 904, 933, 988; 222/196, 222/199, 197
See application file for complete search history.

(56) References Cited

U.S. PATENT DOCUMENTS

| 4,361,202 | A | * | 11/1982 | Minovitch ..................... 180/168 |
| 6,064,301 | A | * | 5/2000 | Takahashi et al. ............. 340/435 |
| 2008/0252483 | A1 | * | 10/2008 | Hodges ......................... 340/905 |
| 2009/0072978 | A1 | * | 3/2009 | Tilson, Jr. .................. 340/572.9 |
| 2009/0115638 | A1 | * | 5/2009 | Shankwitz et al. ........... 340/988 |
| 2009/0121872 | A1 | * | 5/2009 | Lynch et al. ................ 340/572.1 |
| 2011/0043373 | A1 | * | 2/2011 | Best et al. ................ 340/825.49 |

FOREIGN PATENT DOCUMENTS

| JP | 2006-145385 | 6/2006 |
| JP | 2008-63900 | 3/2008 |
| JP | 2009-119828 | 6/2009 |
| JP | 2009-289226 | 12/2009 |

OTHER PUBLICATIONS

Japanese Office Action issued Jul. 5, 2011 in corresponding Japanese Patent Application No. 2010-132489 w/English translation.

* cited by examiner

*Primary Examiner* — Albert Wong
*Assistant Examiner* — Peter Mehravar
(74) *Attorney, Agent, or Firm* — Wenderoth, Lind & Ponack, L.L.P.

(57) ABSTRACT

The present invention provides an apparatus for embedding wireless IC tags in an object to be embedded with wireless IC tags. The apparatus for embedding wireless IC tags including: an alignment unit for aligning the wireless IC tags in the same direction by applying a vibrating force to the wireless IC tags; a distribution unit for distributing the wireless IC tags to a plurality of passages; a radio communication unit for performing, through radio communication, data writing and/or reading to/from the wireless IC tags; and a wireless IC tag embedding unit for embedding the wireless IC tags into an object to be embedded with wireless IC tags by applying air pressure to the wireless IC tags.

19 Claims, 19 Drawing Sheets

Fig7
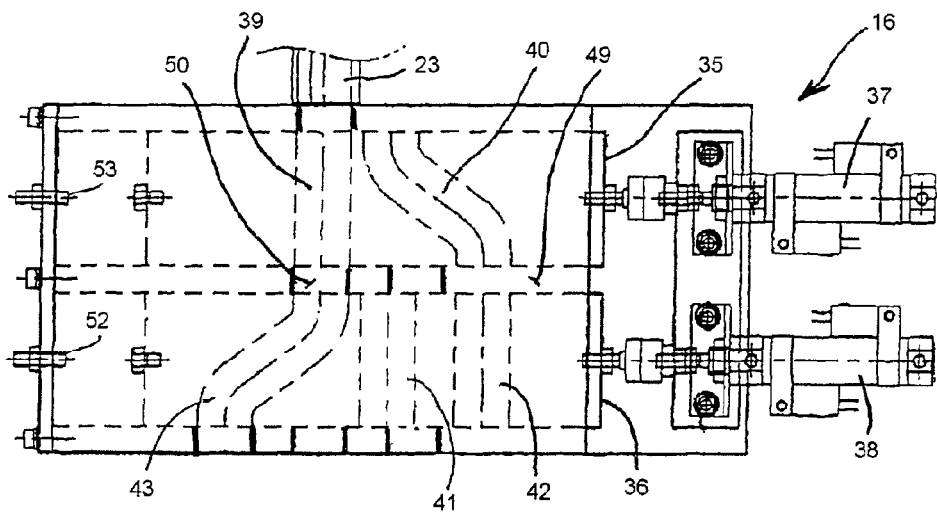
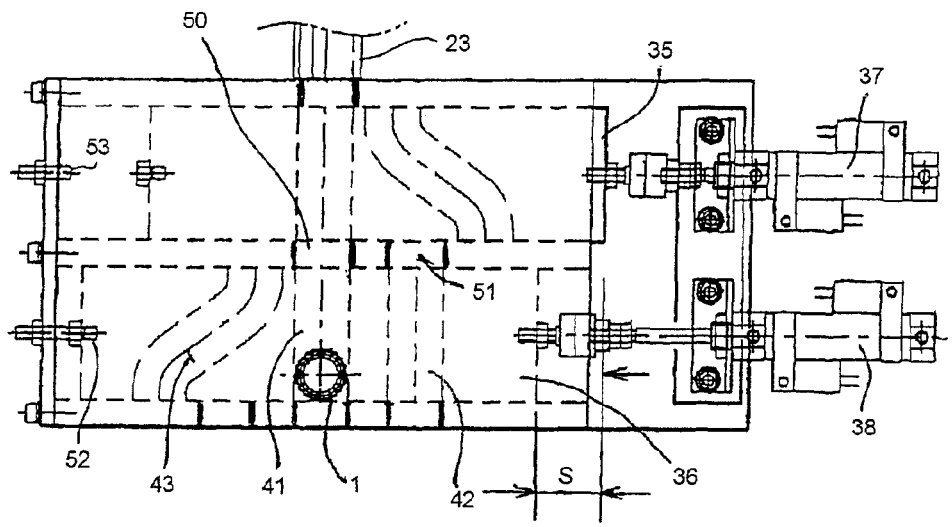
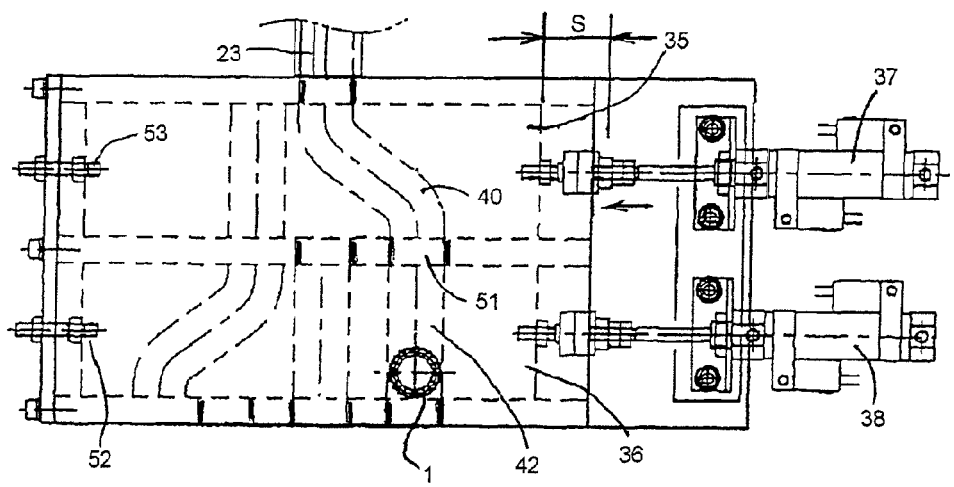

APPARATUS FOR EMBEDDING WIRELESS IC TAGS

1. FIELD OF THE INVENTION

The present invention is related to a data processing and embedding apparatus for wireless IC tags, particularly to a data processing and embedding apparatus, which writes various data required for quality management to wireless IC tags through radio communication, or reads data having been written to wireless IC tags before they are embedded into a mixed/kneaded material being in liquid, viscous or semisolid state, especially unhardened concrete, and then embeds those wireless IC tags to the object to be embedded.

2. PRIOR ART

In the field of the architectural structures made of concrete, for example, a management system where wireless IC tags, to which various product information have been written in view of inspecting records with regard to investigation on earthquake-proof strength, constructions and the like, are embedded in those concrete structures in order to manage the quality of concrete, records of constructions, etc. using the information written in the wireless IC tags has been known. In addition, further requests, without limitation to those concrete structures, that desire to carry out such management using wireless IC tags even for movables such as resin moldings and the like in view of traceability have been raised.

With regard to products, such as unhardened concrete and thermoplastic resins, those which retain a physical state of liquid, viscous or semisolid during the manufacturing process, by writing various data to wireless IC tags beforehand and embedding the wireless IC tags having been written with data inside the product being not yet hardened, it will be possible to write/read various data to/from wireless IC tags having been embedded in a hardened product through radio communication, and therefore, it must be useful for product management for product by product. Further, embedding of the wireless IC tags inside the product is advantageous because it is not required to embed or stick those wireless IC tags to the product afterwards.

A quality control method has been proposed in which wireless IC tags are embedded into unhardened concrete loaded on a vehicle equipped with a concrete mixer, and information on the unhardened concrete is written to those wireless IC tags at the time that the unhardened concrete is casted to build a structure to thereby make it possible to know various information at the time of constructing such a concrete structure (see Patent Document 1). Further, a quality management system for concrete materials using wireless IC tags has been disclosed in which wireless IC tags are embedded into to unhardened concrete during the manufacturing process (see Patent Document 2).

Each of the quality management systems described above is a system in which wireless IC tags are embedded into unhardened concrete beforehand, information on the unhardened concrete, the casting and the concrete structure after the casting are written to the wireless IC tags, and data including the information are read upon requirement. In these quality management systems, however, the details as to the constitution of the data writing apparatus that writes data to the wireless IC tags or the wireless IC tag embedding apparatus are not sufficiently described.

[Patent Document 1]: Japanese Unexamined Patent Application Publication No. 2006-145385

[Patent Document 2]: Japanese Unexamined Patent Application Publication No. 2008-63900

SUMMARY OF INVENTION

In the above-described conventional quality management systems for the concrete structures incorporated with wireless IC tags, it is required to write necessary data to wireless IC tags firmly and correctly during the embedding process, and to prevent a trouble of blockade with wireless IC tags from occurring in the wireless IC tag embedding apparatus, the trouble occurring due to appearance of dust nearby a embedding inlet of the embedding apparatus. However, writing errors have been occurring frequently, because the directivity of the writing sides of wireless IC tags are not fixed, since this sort of conventional wireless IC tag embedding apparatus is configured such that wireless IC tags supplied from a hopper are simply fed to data writing/reading units.

In addition, the conventional wireless tag embedding apparatus has a problem of causing blockade with dust at the embedding inlet due to scattering of cement dust, namely the object to be embedding, and the other problem of being required to position the embedding apparatus just above a mixing/kneading tank, in which the object to be embedding is received, or at the closest position to a mixing/kneading tank, even in the case of using a pipe for feeding dependent on tag dropping.

It is an object of the present invention to provide a data processing and embedding apparatus for wireless IC tags, which can align wireless IC tags in a given direction to feed them to a data writing/reading unit to thereby eliminate errors in writing/reading of information, and which may be installed to any desired position even though it is distant from a mixing/kneading tank for receiving the object to be embedded with wireless IC tags and can embed wireless IC tags securely without causing blockade at the embedding inlet.

Further, it is a further object of the present invention to provide a data processing and embedding apparatus for wireless IC tags, which can connect/disconnect the electric power source remotely and can be operated by designated persons who have been authorized only, and with which the embedding status can be checked even from a place other than the working site.

The data processing and embedding apparatus for wireless IC tags according to the present invention is characterized by including a vibration/alignment unit for aligning wireless IC tags in the same direction by applying vibrating force to the wireless IC tags, a distribution unit for distributing the wireless IC tags having been fed in an aligned state to plural passages, a radio communication unit for performing writing and/or reading of data relative to the distributed wireless IC tags through radio communication, and a wireless IC tag embedding unit for embedding the wireless IC tags subjected to data writing/reading to the object to be embedded with wireless IC tags by applying air pressure to the wireless IC tags.

According to an embodiment of the present invention, the object to be embedded with wireless IC tags is characterized by comprising a liquid, viscous or semisolid material to be received in a mixing/kneading tank.

According to a further embodiment of the present invention, the object to be embedded with wireless IC tags is characterized by comprising unhardened concrete prepared by mixing/kneading cement, water and aggregate.

According to a still further embodiment of the present invention, the vibration/alignment unit is characterized by including a concave disc for receiving a wireless IC tags, a round-shaped feeding path formed to the periphery of the concave disc, and a vibration-applying drive member for vibrating the concave disc and the round-shaped feeding path, and the round-shaped feeding path includes an IC tag inlet connecting to the concave disc at one end and an evacuation outlet connecting to an IC tag dropping chute at the other end.

According to a still further embodiment of the present invention, the data processing and embedding apparatus of the invention is characterized in that the evacuation outlet of the vibration/alignment unit and the distribution unit are connected to each other by providing the IC tag dropping chute therebetween, the IC tag dropping chute is provided with a stopper to temporarily stop the wireless IC tags dropping through the IC tag dropping chute and a sensor for detecting the temporary stop of the wireless IC tags, and the stopper is released in response to a detection signal from the sensor, and the wireless IC tags are then fed one by one to the distribution unit.

According to a still further embodiment of the present invention, the apparatus of the invention is characterized in that a measuring means for counting the wireless IC tags passing through the IC tag dropping chute is provided to the IC tag dropping chute.

According to a still further embodiment of the present invention, the apparatus of the invention is characterized in that the distribution unit includes a first slider having at least one passage which can align with the IC tag dropping chute, a second slider having plural passages which can align with the passages of the first slider, and a cylinder unit for moving the first and second sliders being in a folded state, and any one passage of the first slider and any one passage of the second slider are connected to each other by virtue of the relative movement in a folded state of the first and second sliders, while the other passages are blocked.

According to a still further embodiment of the present invention, the apparatus of the invention is characterized by including a passage block having plural IC tag passages and being arranged at a level lower than the level of the distribution unit, and a passage opening/closing unit arranged at a level lower than the level of the passage block and adapted to open/close the IC tag passage, the radio communication unit is arranged so as to oppose the passage block in each passage of the passage block, and data writing or reading relative to the wireless IC tags being stopped in the passage provided in the passage block is carried out by the passage opening/closing unit.

According to a still further embodiment of the present invention, the apparatus of the invention is characterized by including a defective evacuation unit, which is arranged at a level lower than the level of the passage opening/closing unit and is actuated in response to a signal given by a defective detection section for detecting defective wireless IC tags.

According to a still further embodiment of the present invention, the defective evacuation unit is characterized by including a defective evacuation member capable of sliding and provided with a defective dropping pore and normal tag feeding passage, and a sliding drive section of the defective evacuation member actuating in response to a signal given by the defective detection section.

According to a still further embodiment of the present invention, the apparatus of the invention is characterized in that the wireless IC tag embedding unit is arranged at a level lower than the level of an IC tag reception passage communicating with the normal tag feeding passage of the defective evacuation member and includes a cutting member capable of sliding and provided with an IC tag receiving concave and a compressed air feeding/evacuating section disposed distant from the IC tag receiving passage toward the lateral side, the cutting member is driven to slide so that the IC tag receiving concave reciprocates between the position of the IC tag receiving passage and the position of the compressed air feeding/evacuating section, and wireless IC tags received in the receiving concave are released by applying compressed air at the position of the compressed air feeding/evacuating section.

According to a still further embodiment of the present invention, the apparatus of the invention is characterized in that a hose for releasing the wireless IC tags is connected to the compressed air feeding/evacuating section.

According to a still further embodiment of the present invention, the apparatus of the invention is characterized by including a remotely-operable apparatus actuation power source and the operating status of the apparatus can be monitored via an internet system.

According to a still further embodiment of the present invention, the apparatus of the invention is characterized in that the apparatus actuation power source can be remotely-operated by inputting a touch panel board ID.

According to a still further embodiment of the present invention, the apparatus of the invention is characterized in that the radio communication unit is a non-contact type radio communication unit, which is electrically connected to a database in either a wired manner or a wireless manner and outputs radio waves of a preset frequency band to carryout radio communication to thereby write product information data stored in said database to wireless IC tags.

According to a still further embodiment of the present invention, the apparatus of the invention is characterized in that the radio communication unit is a radio communication unit in which a ferroelectric memory using a ferroelectric material includes a power source section for receiving radio waves from the radio communication unit and resonate with those waves to thereby generate current and an antenna section for performing radio communication at a preset frequency band is mounted to the substrate of the wireless IC tag, and the radio communication unit outputs radio waves of the communication frequency band to be used for the wireless IC tags to the wireless IC tag in which the data is stored in the ferroelectric memory.

According to a still further embodiment of the present invention, the apparatus of the invention is characterized in that the wireless IC tag has a bale-like shape being symmetrical relative to the axis line and capable of rolling and moving freely, and data writing or reading is carried out from the direction opposite to the end face of the bale-like shape.

Further, the vibration/alignment unit is characterized by including a wireless IC tag opening for freely mounting a cartridge in which wireless IC tags are included.

The data processing and embedding apparatus for wireless IC tags according to the present invention includes a vibration/alignment unit for aligning wireless IC tags in the same direction by applying vibration force to the wireless IC tags, a distribution unit for distributing the wireless IC tags having been fed in an aligned state to plural passages, a radio communication unit for performing writing and/or reading of data relative to the distributed wireless IC tags through radio communication, and a wireless IC tag embedding unit for embedding the wireless IC tags having been subjected to data writing/reading to the object to be embedded with wireless IC tags by applying air pressure to the wireless IC tags, and therefore, the directivity of the wireless IC tags at the writing/reading position is fixed by the alignment means of the wireless IC tag, which makes to decrease information writing errors. Further, with the apparatus according to the present invention, contrary to the conventional method, the embedding of the wireless IC tags is not carried out by dropping them by virtue of their own weight, which makes free to select a place for installing the apparatus, no appearance of dust from the object to be embedded is caused, and blockade with dust at the point of the embedded inlet will be drastically reduced.

BRIEF DESCRIPTION OF THE DRAWINGS

FIG. 7 A front view of a distribution unit according to an embodiment of the present invention.

DESCRIPTION OF THE REFERENCE NUMERALS

Figure 1:
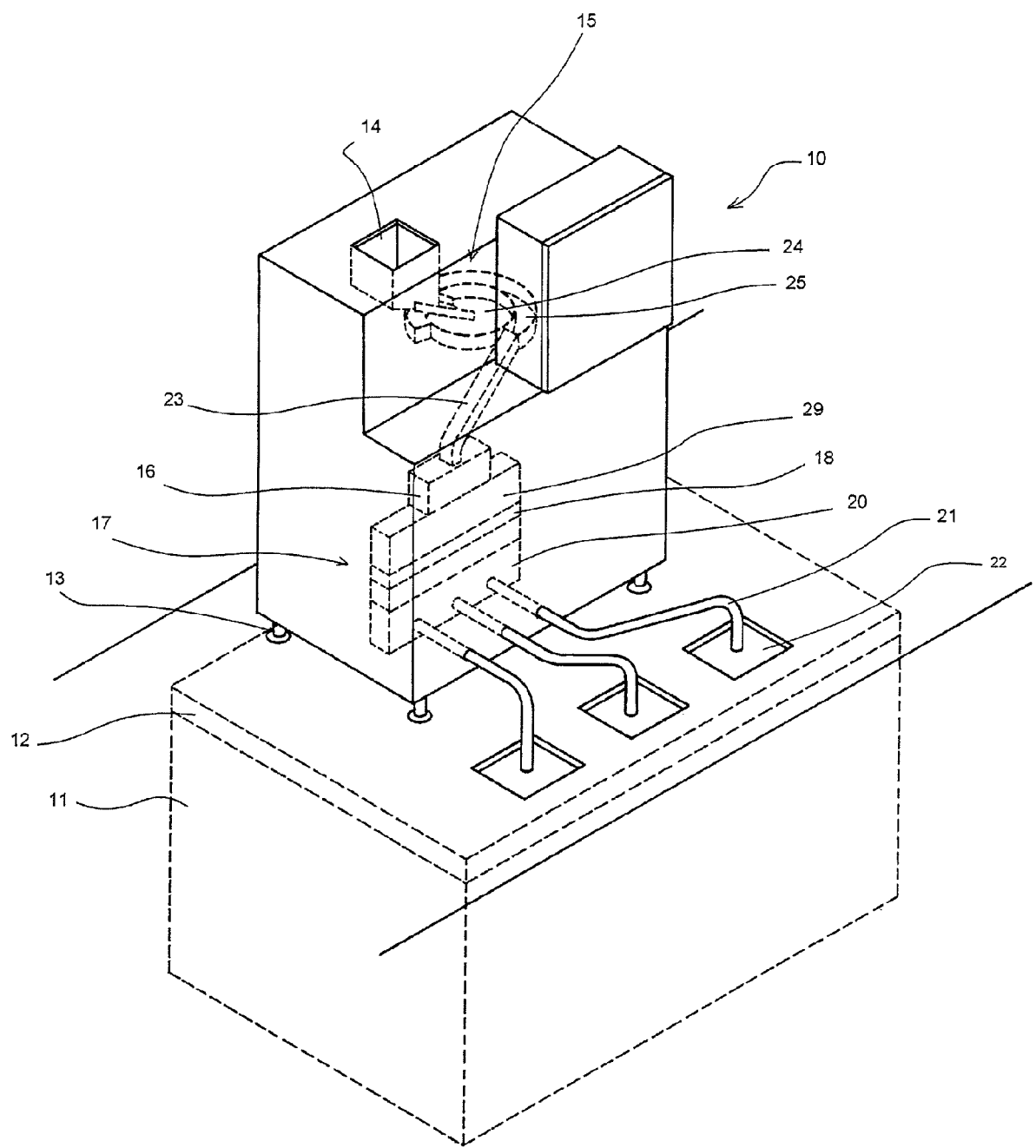
FIG. 1 A schematic perspective view showing the whole structure of a data processing and embedding apparatus for wireless IC tags according to an embodiment of the present invention.

1. Wireless IC tag
2. Both end faces of wireless IC tag
21. Periphery of wireless IC tag
22. Convex band
10. Data processing and embedding of wireless IC tags
11. Mixing/kneading tank
14. Hopper
15. Vibration/alignment unit
16. Distribution unit
17. Radio communication unit
18. Stopper unit
19, 70. Defective evacuation unit
20, 80. Wireless IC tag embedding unit
21: Air hose
23: Dropping chute
24: Concave disc
25: Round-shaped feeding passage
27: Chute
29: Passage block
30: Stopper mechanism
31, 32: Stopper member
33: Temporary stop detection sensor
34: Measuring sensor
35, 36: Slider
37, 38: Cylinder unit of distribution unit
39: First passage
40: Second passage
41: First passage
42: Second passage
43: Third passage
45: First passage
46: Second passage
47: Third passage
49: Partition wall
50, 51: Pore of partition wall
52, 53: Stopper
55: Passage opening/closing unit
56: Opening/closing member
57: Cylinder unit of passage opening/closing unit
58: Stopper member
59, 60, 61: Opening
62-64: Data writing/reading unit
72: Defective evacuation member
73: Cylinder unit of defective evacuation member
76: Normal tag feeding passage
77: Defective dropping pore
81: IC tag reception passage
82-84: Receiving concave
85: Cutting member
86: Cutting cylinder unit
88: Air ejection groove
89: Compressed air ejection outlet (Nozzle)
90: Compressed air evacuation outlet
91: Air feeding pipe
101: Cartridge
102: Box
103: Opening
104: Rail

DETAILED DESCRIPTION OF THE PREFERRED EMBODIMENT

Now, the embodiments according to the present invention will be explained with reference to the appended drawings. Note that, though an example of embedding wireless IC tags to unhardened concrete is shown in the following examples, it is not intended to limit the object to be embedded to unhardened concrete, and any material which can retain a state of liquid, viscous or semisolid, such as a thermoplastic resin in fused state, unhardened gypsum and the like, will be applicable.

Figure 18:
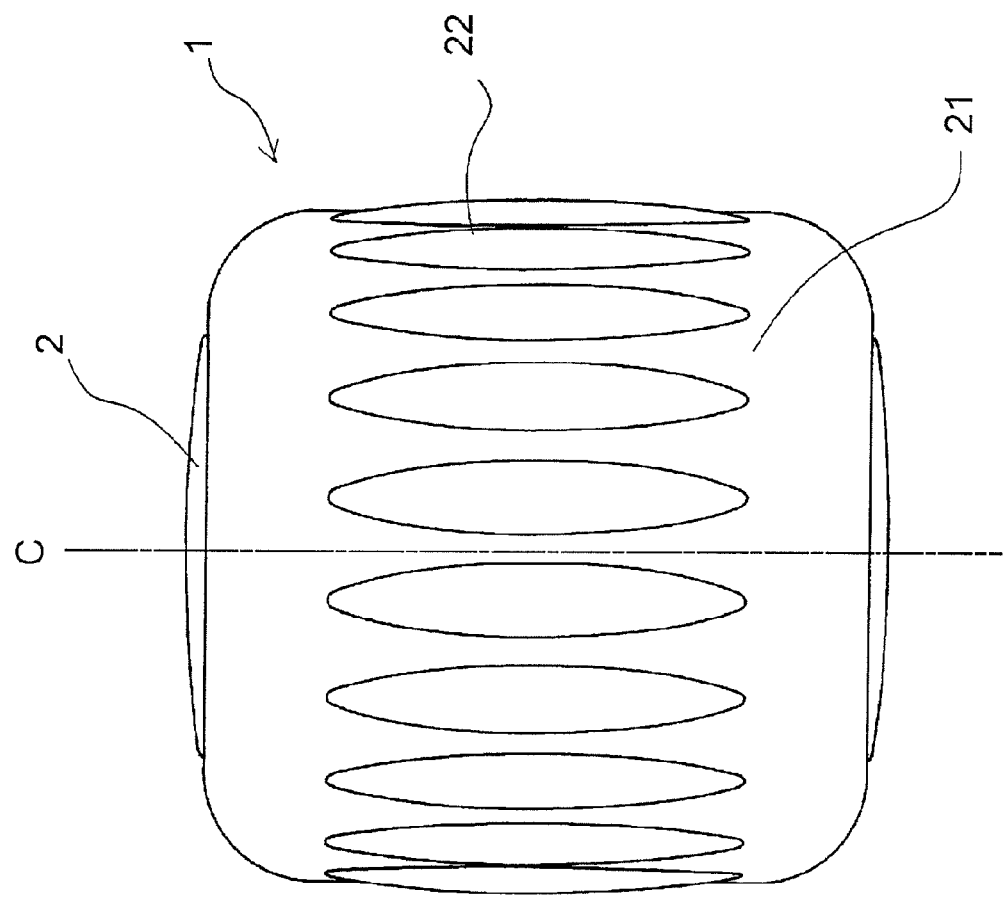
FIG. 18 A side view of an example of a wireless IC tag, which is applicable to an embodiment of the present invention.

At first, wireless IC tag applicable to the example of the present invention will be explained. As shown in FIG. 18, the wireless IC tag 1 used in this example is configured to a bale-like shape having plane or slightly convex end faces 2 at both ends and a round-shaped periphery 21 and being symmetrical relative to the axis line (rotation axis line) C passing through the centers of said both end faces 2. A plurality of convex bands 22 are formed in the periphery with approximately equal distance, which give better cohesion property and affinity between the wireless IC tags and the object to be charged, namely the unhardened concrete. The bale-shaped outer shell of a wireless IC tag is consisted of a coverture prepared with a thermoplastic resin, and a wireless IC tag chip is embedded in the center of the wireless IC tag.

A wireless IC tag chip constituting a wireless IC tag 1 is a memory, called as RFID tag, capable of writing/reading data, wherein an FeRAM chip, for example, which is a ferroelectric memory using a ferroelectric as a memory element for an IC tag is mounted onto a substrate made of a metal plate, a ceramic plate or the like of the IC tag.

Any type of FeRAM may constitute an FeRAM chip of a wireless IC tag, and either a capacitor-type or a transistor-type thereof may be used, for example. Note that the type which can be used easily for a product management system and the like is a passive-type FeRAM, to which no power source is mounted, but rectifies electric waves for data access obtained from the outside to use the rectified as a power source. To this FeRAM chip, an FeRAM being a non-volatile memory using a ferroelectric material, an electric power source section for, without being mounted with a power source, receiving electric waves from the outside and then resonating therewith to generate current, and an antenna section prepared in a film form for performing radio communication are mounted.

The bale-shaped wireless IC tag 1 employed in this example can pass smoothly while rolling and moving and securely keeping the directivity through a passage provided in a charging unit which will be described later. Note that data writing and reading are carried out to the end face 2 of the bale-shaped tag.

FIG. 1 is a perspective view schematically showing the whole structure of a data processing and embedding apparatus for wireless IC tags according to the present invention. With reference to FIG. 1, the data processing and embedding apparatus 10 for wireless IC tags is installed on a plate placed at the top of a mixing/kneading tank 11, which is used for receiving unhardened concrete as an object to be embedded with wireless IC tags, via legs 13. A hopper 14 for receiving wireless IC tags is arranged on the top of the data processing and embedding apparatus 10, and a vibration/alignment unit 15 for receiving wireless IC tags supplied from the hopper 14 and then vibrating and feeding those tags simultaneously is installed in the casing of the apparatus. A distribution unit 16 is arranged at a lower level than the level of the vibration/alignment unit 15, and a radio communication unit 17 for writing/reading data to/from wireless IC tags and a stopper unit 18 for temporarily stop wireless IC tags for data writing/reading are installed at a level lower than the level of the distribution unit 16. Note that, in this example, the apparatus is so configured that a passage block 29 including three passages is arranged under the distribution unit 16, the stopper unit 18 is arranged at the end of the passage of the passage block 29, and three data writing/reading units constituting the radio communication unit 17 are arranged at the lateral side of the passage block 29. The configuration described hereinabove will be explained further in the following.

At a level lower than the level of the stopper unit 18, a defective evacuation unit 19 for evacuating wireless IC tags with writing errors and embedding unit 20 for embedding normal tags to unhardened concrete received in the mixing/kneading tank 11 are arranged. An air hose 21 for feeding wireless IC tags is connected to an embedding inlet of the embedding unit 20. The wireless IC tags are embedded by means of air pressure from an opening 22 provided in the top plate 12 of the mixing/kneading tank 11 to unhardened concrete received in the tank through the air hose 21, and are mixed/kneaded with unhardened concrete in the mixing/kneading tank 11. The reference numeral 23 denotes a dropping chute for feeding wireless IC tags from the vibration/alignment unit 15 to the distribution unit 16.

Figure 2:
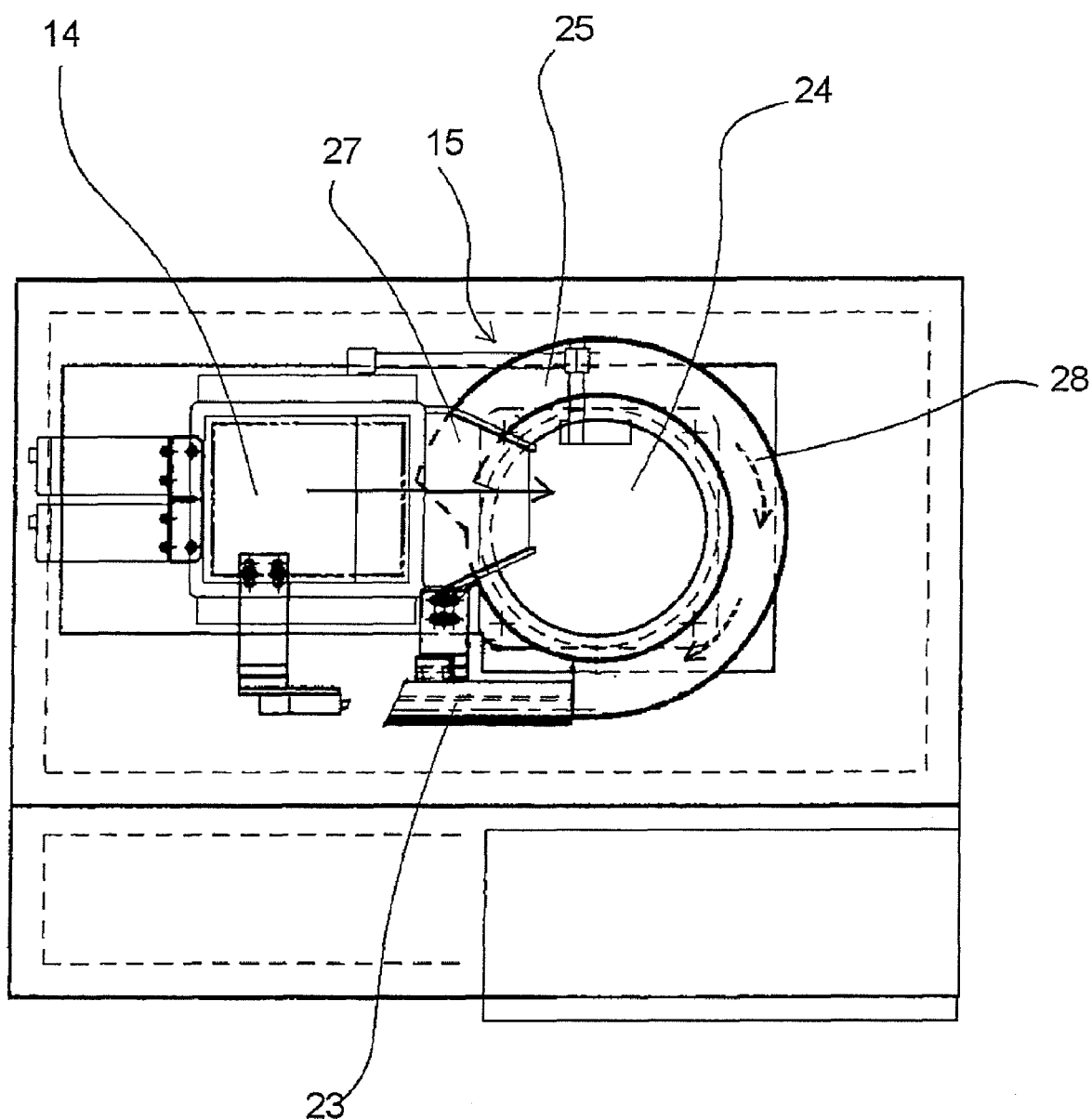
FIG. 2 A top view of a vibration/alignment unit of a data processing and embedding apparatus for wireless IC tags according to an embodiment of the present invention.

FIG. 2 is a top view of the vibration/alignment unit 15 shown in FIG. 1. With reference to FIG. 1 and FIG. 2, the vibration/alignment unit 15 includes a concave disc 24, the bottom of which has been concaved like a dish, a round-shaped feeding path 25 surrounding the concave disc 24, and a vibration-applying drive unit 26 (FIG. 3) disposed at a level lower than the level of the concave disc 24. Wireless IC tags received in the hopper 14 are supplied to the concave disc 24 of the vibration/alignment unit 15, then gradually fed in a state that the end faces of wireless IC tags are contacting with each other to thereby being aligned from the concave disc to the round-shaped feeding path 25 by virtue of vibrating force as shown with a broken line arrow 28 in FIG. 2, and then fed from the evacuation outlet 25a of the round-shaped feeding path 25 to the distribution unit 16 through the IC tag dropping chute 23. Note that the wireless IC tags are dropping on the IC tag dropping chute 23 while causing rolling due to their shape of the peripheries.

Figure 4:
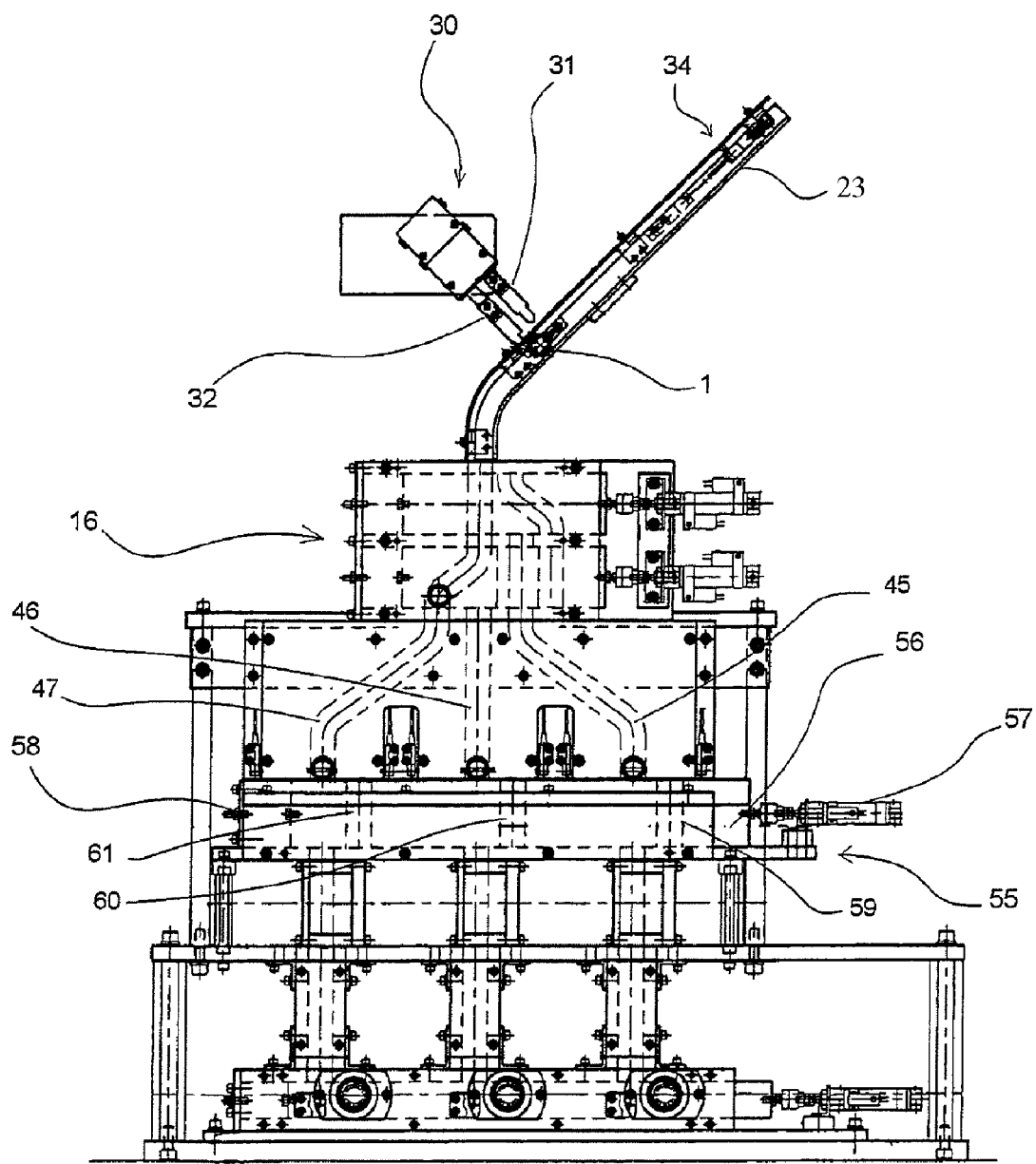
FIG. 4 A front view of a similar data processing and embedding apparatus, showing the main part in detail.
Figure 5:
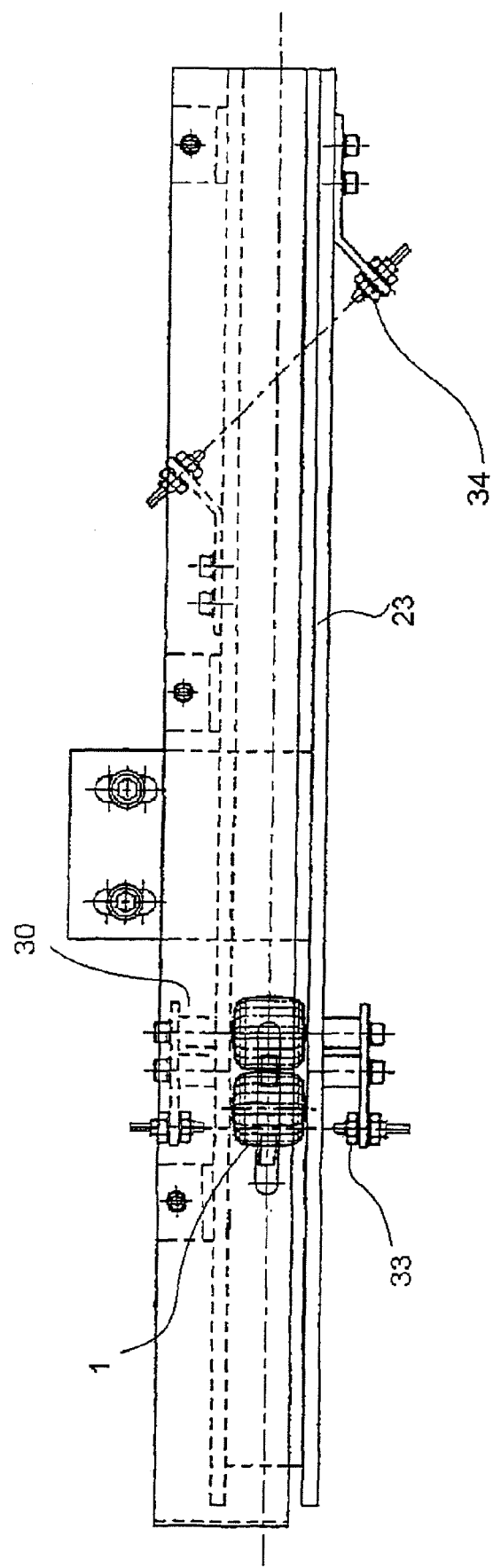
FIG. 5 A top view of an IC tag dropping chute according to an embodiment of the present invention.
Figure 6:
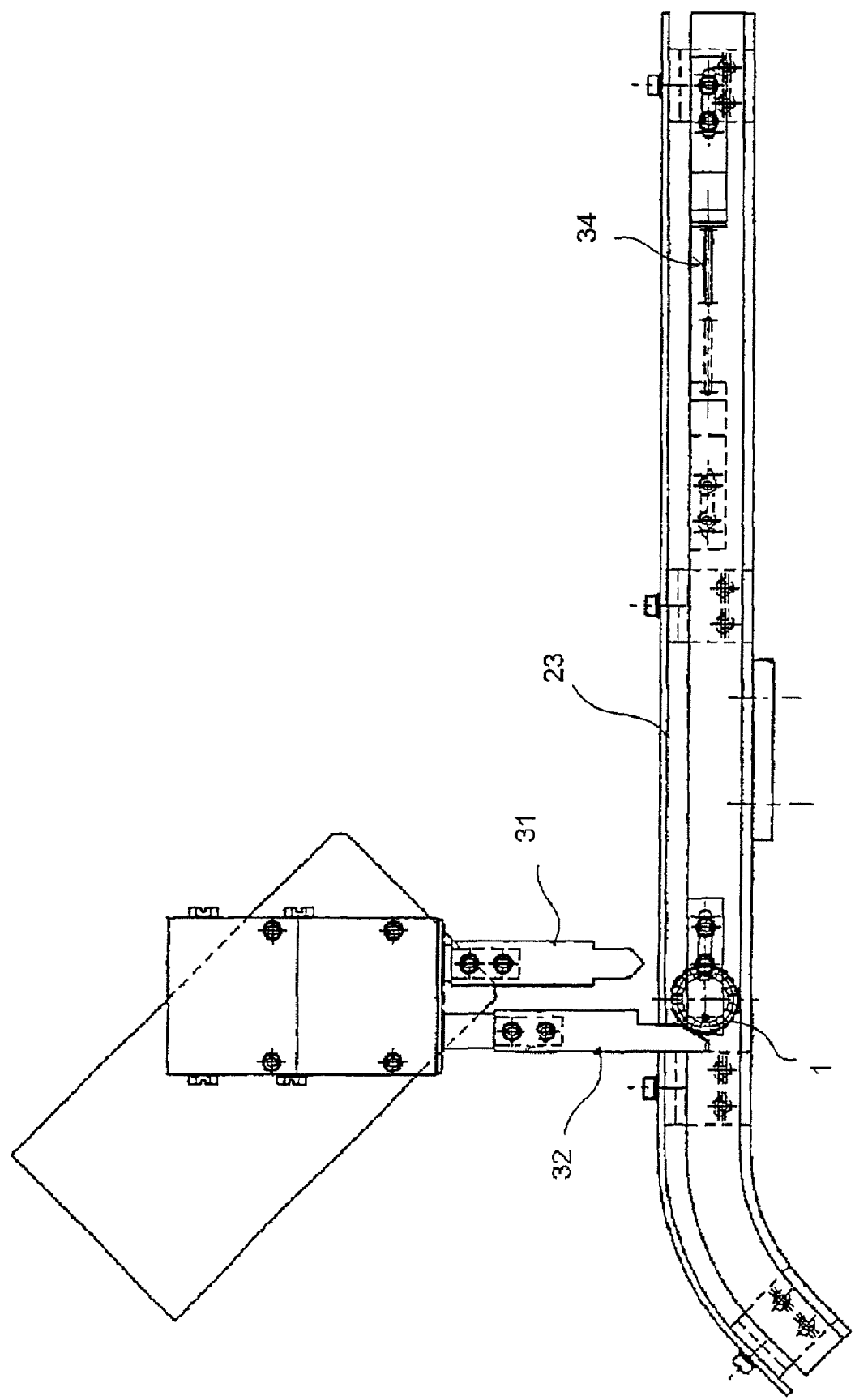
FIG. 6 A front view of an IC tag dropping chute according to an embodiment of the present invention.

With reference to FIG. 4 to FIG. 6, the IC tag dropping chute 23 is provided with a stopper mechanism 30 including a pair of stopper members 31, 32 which operates to alternately protrude and withdraw, and temporary stop detection sensor 33 which faces to the IC tag dropping chute 23 at the position of the stopper mechanism 30 and detects the temporary stop of wireless IC tags to control the operation of the stopper mechanism 30. Further, the IC tag dropping chute 23 is further provided with a measuring sensor 34 for detecting the passing of wireless IC tags 1 at the position being upstream of the stopper mechanism 30 to determine the number of wireless IC tags having had passed through the IC tag dropping chute 23.

Following to that the number of the passing wireless IC tags 1 is determined by means of the measuring sensor 34, the wireless IC tags pass through the upper stopper member 31 locating at the withdrawn position, and then contacted with the lower stopper member 32 being in the protruded (advanced) position to stop there (the state shown in FIG. 6). The lower stopper member 32 withdraws from the dropping chute in response to a signal outputted from the temporary stop detection sensor, that detected the stop of the wireless IC tags, to feed the wireless IC tags. At the same time, the upper stopper member 31 advanced toward the chute 23 to close the dropping chute so that the wireless IC tags subsequently fed are stopped. Then the lower stopper member 32 advances and the upper stopper member 31 withdraws, simultaneously, then the wireless IC tags 1 are temporarily stopped by the lower stopper member 32 and a signal is outputted from the temporary stop detection sensor 33. In this manner, the wireless IC tags 1 continuously dropping through the IC tag dropping chute 23 are fed one by one to the distribution unit 16 locating at the lower level.

Figure 8:
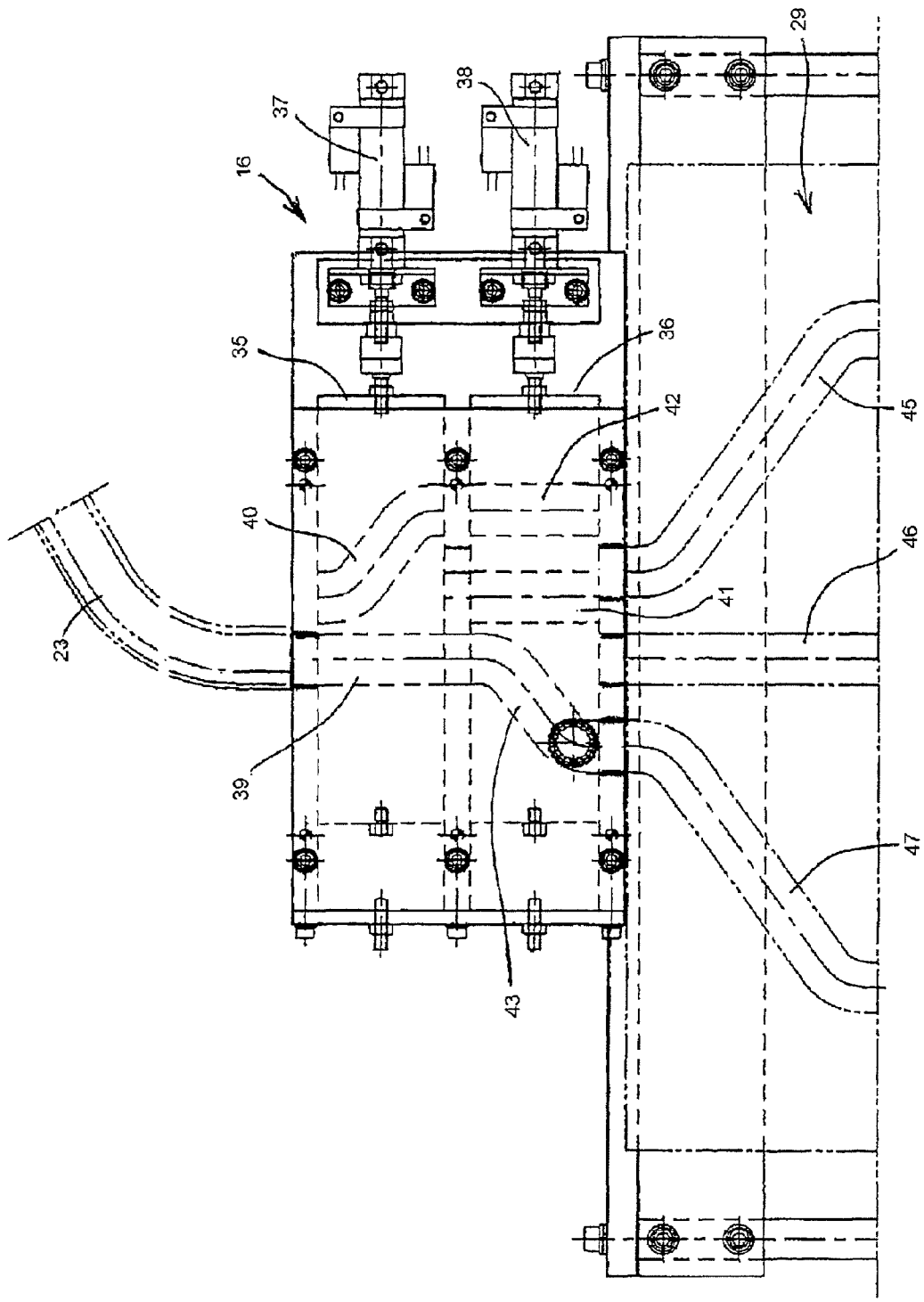
FIG. 8 A front view showing the positional relationship between a distribution unit and passage blocks.

Now, the distribution unit will be explained with reference to FIG. 4, FIG. 7 and FIG. 8. The distribution unit 16 includes an upper first slider 35 and a lower second slider 36, which are superposed with each other and moved relative to each other in a folded state, and a first and a second cylinder units 37, 38 each connected to a slider 35 or 36, respectively. The first slider 35 is so formed that both a straight first passage 39 and an inclined second passage 40 are passing through the first slider 35. By causing to move the first slider 35 by the first cylinder unit 37, either one of the first passage 39 or the second passage 40 is adapted to align with the lower end of the IC tag dropping chute 23.

The second slider 36 is formed such that straight first and second passages 41, 42 and an inclined third passage 43 are passing therethrough. When the second slider 36 is moved by the second cylinder unit 38 which drives the second slider 36, any one of the first to third passages 41, 42, 43 aligns with any one of two passages 39, 40 of the first slider 35, and the lower ends of the passages 41, 42, 43 of the second slider align with any one of three passages 45, 46, 47 in the passage block 29, respectively, in the vicinity of the radio communication unit 17 described later. Note that the situation shown in FIG. 4 and FIG. 8 is such a situation that the straight passage 39 of the first slider 35 is connected with the dropping chute 23 and the inclined passage 43 of the second slider 36, and the inclined passage 43 of the second slider 36 is connected with the third passage 47 in the passage block 29.

Now, the distribution operation of the wireless IC tags by means of the distribution unit 16 shown in FIGS. 7(a) to 7(c) will be explained. In this example, the wireless IC tags falling from the dropping chute 23 one by one are distributed to three passages in the passage block 29. At first, as shown in FIG. 7(a), the straight passage 39 in the first slider 35 aligns with the IC tag dropping chute 23 under the state that both the first cylinder 37 of the first slider 35 and the second cylinder unit 38 of the second slider 36 stay at zero position, and the passage 39 aligns with the inclined passage 43 in the second cylinder 36 via a pore 50 in the partition wall 49. The other passages in both sliders 35, 36, namely the inclined passage 40 in the first slider 35 and two straight passages 41, 42 in the second slider 36 are blocked by the partition wall 49. The wireless IC tags falling from the dropping chute 23 are fed to the third passage 47 in the lower second passage block 29 through the passages 39, 43 where both sliders 35, 36 are connected.

Now, as shown in FIG. 7(b), under the state that the first cylinder unit 37 is kept at zero position, the second cylinder unit 38 is driven so that its cylinder rod is extended to get a further length just corresponding to its stroke S, which causes the position of the second slider 36 to be changed. As a result, the straight passage 39 in the first slider 35 aligns with the straight passage 41 in the second slider 36 (the passage adjacent to the inclined passage 43 in the second slider) via the one pore 50 in the partition wall 49, and the other two passages 42, 43 in the second slider 36 are blocked against the passages 39, 40 in the first slider 35. At that time, since the straight passage 41 in the second slider 36 connected with the passage 39 in the first slider 35 is connected with the central passage in the passage block 29, namely the second passage 46, the wireless IC tags fed from the dropping chute 23 are further fed to the central passage (second passage) in the passage block 29 via those connected passages 39, 41. Note that, when the second slider 36 has moved over a distance corresponding to its stroke S, the end of said slider 36 contacts with a stopper 52 of the distribution unit 16, and the position of the slider is then fixed.

Then, with reference to FIG. 7(c), while keeping the state that the second slider 36 has been extended to get a further length corresponding to its stroke S, the first cylinder unit 37 is driven and the cylinder rod thereof is extended to get a further length corresponding to its stroke S, and the end of the first slider 35 comes to contact with the stopper 53 of the distribution unit 16. At that time, the inclined passage 40 in the first slider 35 aligns with the lower end of the IC tag dropping chute 23 and further aligns with the straight passage 42 in the second slider 36 (namely the straight passage at a position nearby the cylinder unit) via the other pore 51 in the partition wall 49. Then, the aligned passage 42 in the second slider 36 is connected with the first passage 45 (FIG. 8) in the passage block 29, the wireless IC tags 1 fed from the dropping chute 23 are further fed to the first passage 45 in the lower passage block 29 through those connected passages 40, 42. Then, both of the first and second sliders 35, 36 have moved a distance corresponding to their stroke S toward the cylinder unit to thereby return to the original state as shown in FIG. 7(a). Subsequently, by repeating the above-described operations in turn, the wireless IC tags to be fed from the IC tag dropping chute 23 continuously at a preset interval are fed one by one to three passages 45, 46, 47 of the passage block 29 in turn.

Figure 9:
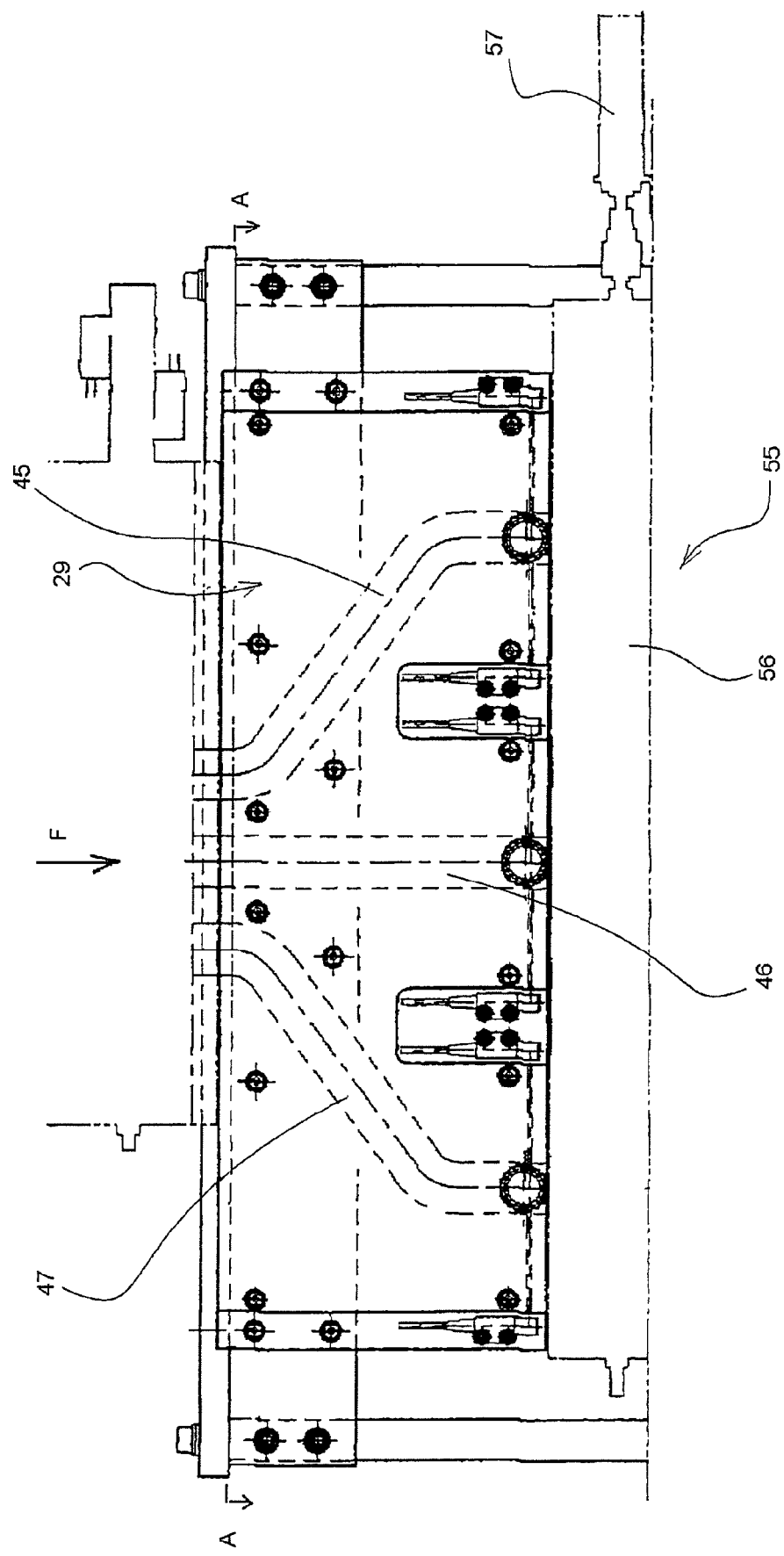
FIG. 9 A detailed front view of passage blocks according to an embodiment of the present invention.

With reference to FIG. 9, a passage opening/closing unit 55 is arranged to a level lower than the level of the passage block 29 including three separated passages 45, 46, 47. The passage opening/closing unit 55 is structured to open/close the three passages 45, 46, 47 of the passage block 29 and includes an elongated opening/closing member 56 provided with three through openings 59, 60, 61 which can be aligned with the three passages 45, 46, 47 of the passage block 29, a cylinder unit 57 to be connected to one end of the opening/closing member 56, and a stopper member 58 (FIG. 4) for contacting with the other end of the opening/closing member 56 to determine the position of the opening/closing member 56. The opening/closing member 56 is driven by the cylinder unit 57 of the opening/closing member 56 to reciprocate in its longitudinal direction. When three openings 59, 60, 61 in the opening/closing member 56 align with three passages 45, 46, 47 of the passage block 29, those passages 45, 46, 47 of the passage block 29 are opened, and the wireless IC tags are fed to either the IC tag embedding unit or the defective evacuation unit, both locating at a lower level. Besides, the opening/closing member 56 of the passage opening/closing unit 55 has moved, and consequently the three openings 59, 60, 61 became in non-connected state with the passages 45, 46, 47 of the passage block 29, those three passages 45, 46, 47 of the passage block 29 are blocked by the opening/closing member 56, and the wireless IC tags 1 are forced to stay in the passage of the passage block 29 in a temporarily stop status.

Figure 10:
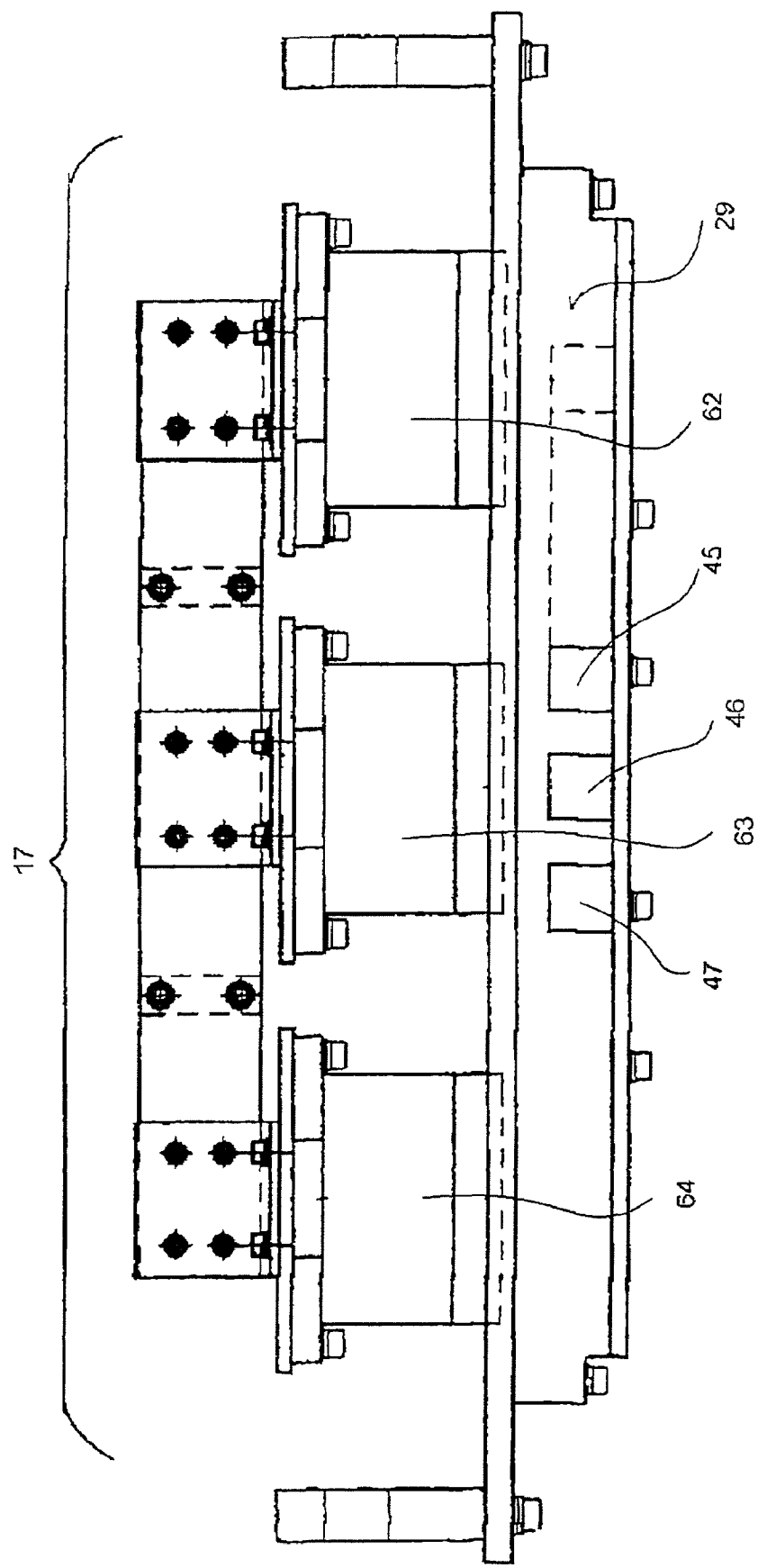
FIG. 10 A top view of passage blocks and radio communication units drawn from the direction indicated by an arrow F shown in FIG. 9.
Figure 11:
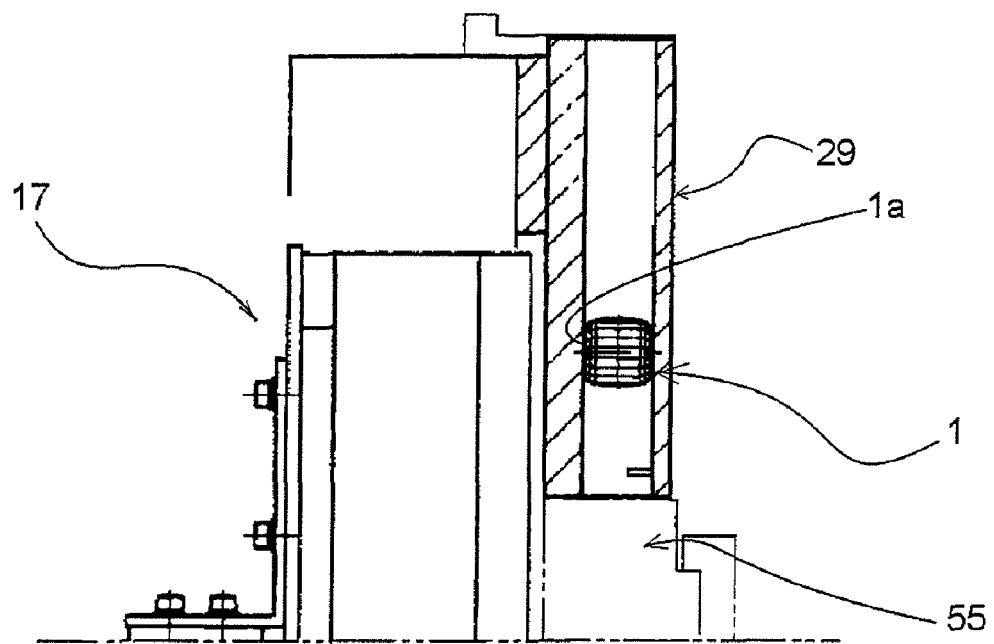
FIG. 11 A cross-sectional view taken along A-A line shown in FIG. 9.
Figure 12:
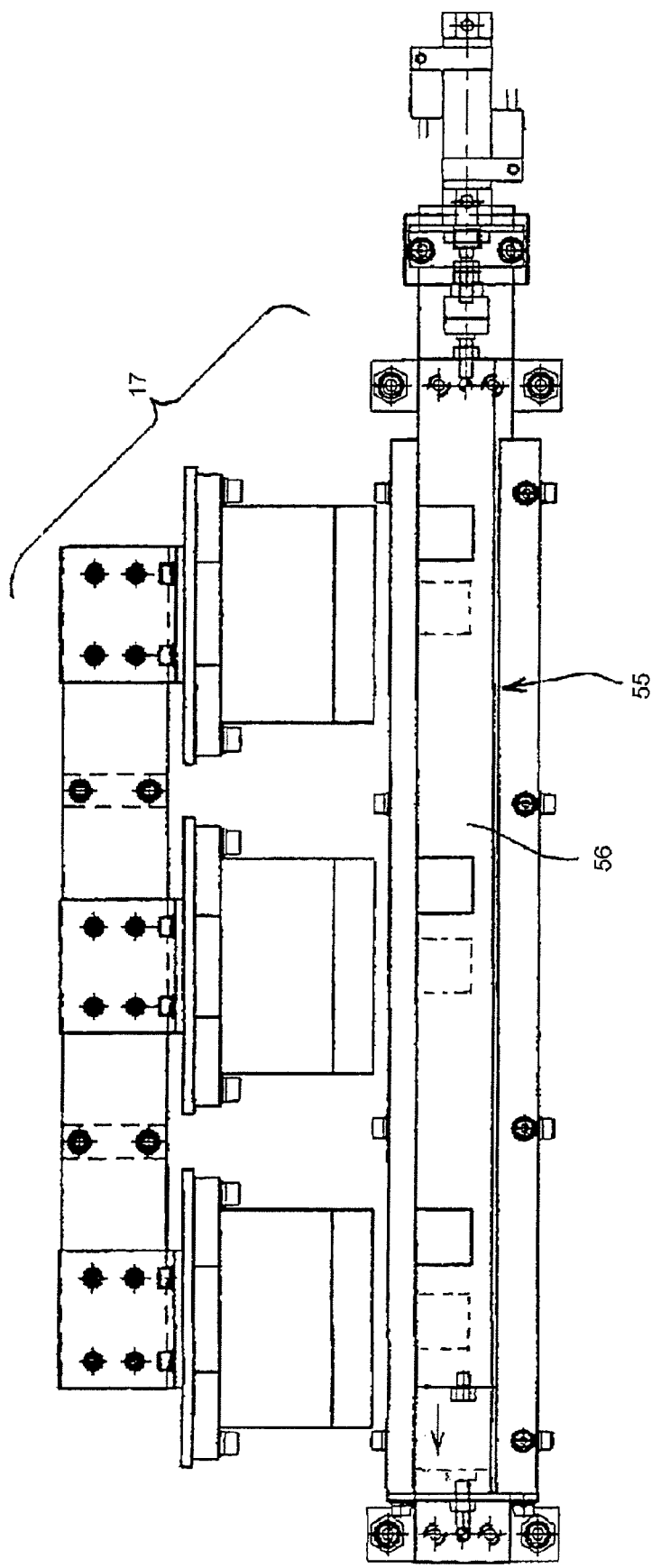
FIG. 12 A top view showing the relationship between radio communication units and passage opening/closing units according to an embodiment of the present invention.

FIG. 10 is a top view of the passage block 29 and the radio communication unit 17, which is drawn from the direction indicated by an arrow F shown in FIG. 9, and FIG. 11 is a cross-sectional view of the passage block shown in FIG. 9 taken along A-A line shown therein. FIG. 12 is a top view showing the relationship between the radio communication unit 17 and the passage opening/closing unit 55. Referring to these drawings, three data writing/reading units 62, 63, 64 of the radio communication unit 17 are disposed in a state separating from each other at the backside of the passage block 29. The three data writing/reading units 62, 63, 64 are disposed to positions each corresponding to three passages 45, 46, 47 of the passage block 29, those positions are adjacent to the radio communication unit 55 and are in the vicinity of the passage block 29. When three passages 45, 46, 47 of the passage block 29 are blocked by the opening/closing member 56, data writing/reading to/from the wireless IC tags having been forced to stay in the block 29 is carried out by data writing/reading units 62, 63, 64 through radio communication. During this operation, as shown in FIG. 11, the wireless IC tags roll and move, and then stop in the passage so that the end faces of the wireless IC tags oppose to the data writing/reading units, and followed by writing data to the wireless IC tags through the end face thereof. The bale-shaped wireless IC tags according to this invention roll with their own tag peripheral surfaces, while keeping such a state of the wireless IC tags that the end face thereof oppose to the inside wall of the passage. Consequently, the end face of tags oppose to the data writing/reading unit all the time, and because of that, data writing/reading may be achieved securely, and the occurrence of writing errors may be remarkably reduced. After finishing the data writing/reading the passages 45, 46, 47 of the passage block 29 are opened, and the wireless IC tags 1 are fed to the embedding unit or the defective evacuation section of the defective evacuation unit locating at the lower level.

Figure 13:
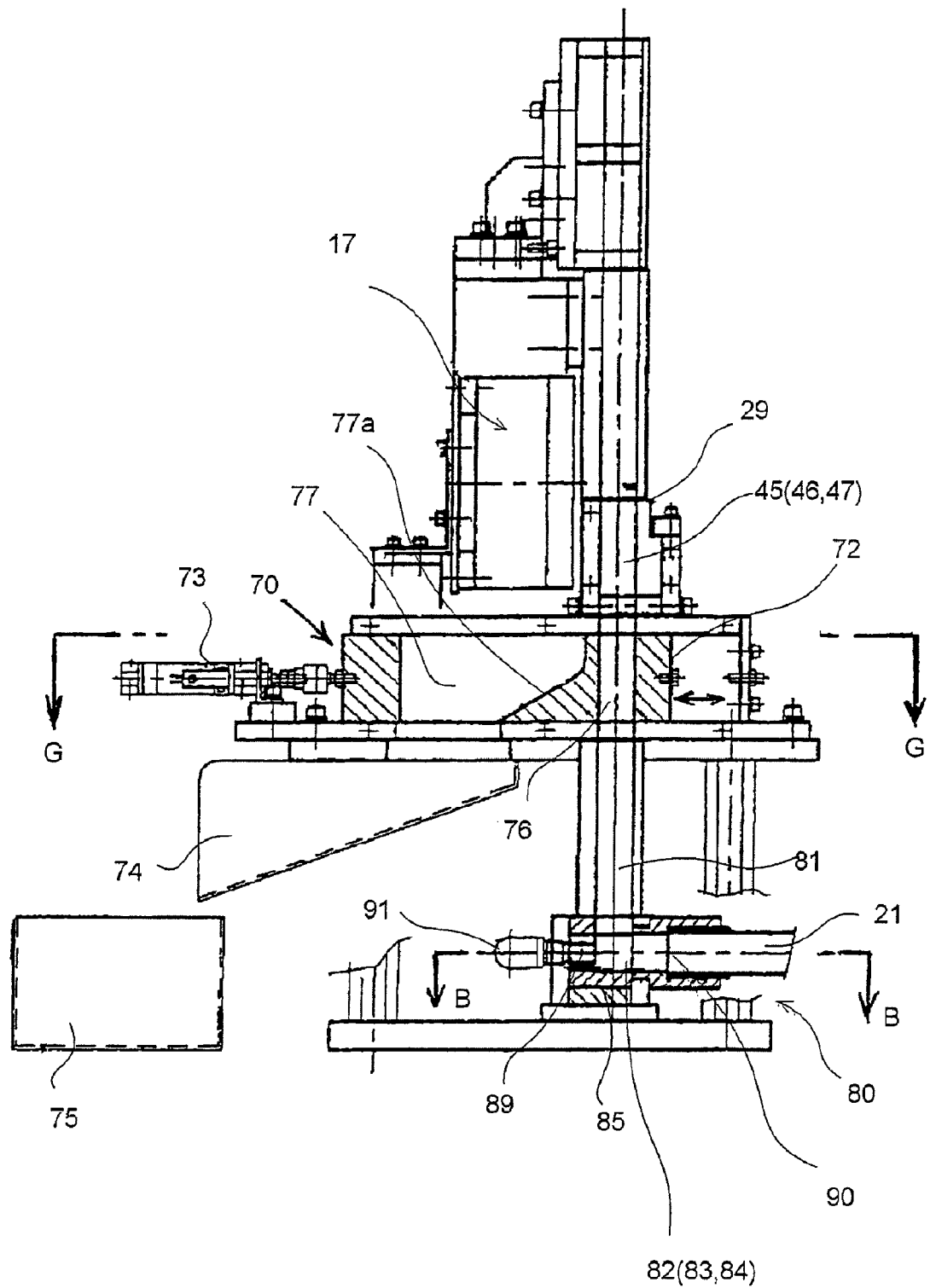
FIG. 13 A lateral cross-sectional view of a defective evacuation unit according to an embodiment of the present invention.
Figure 14:
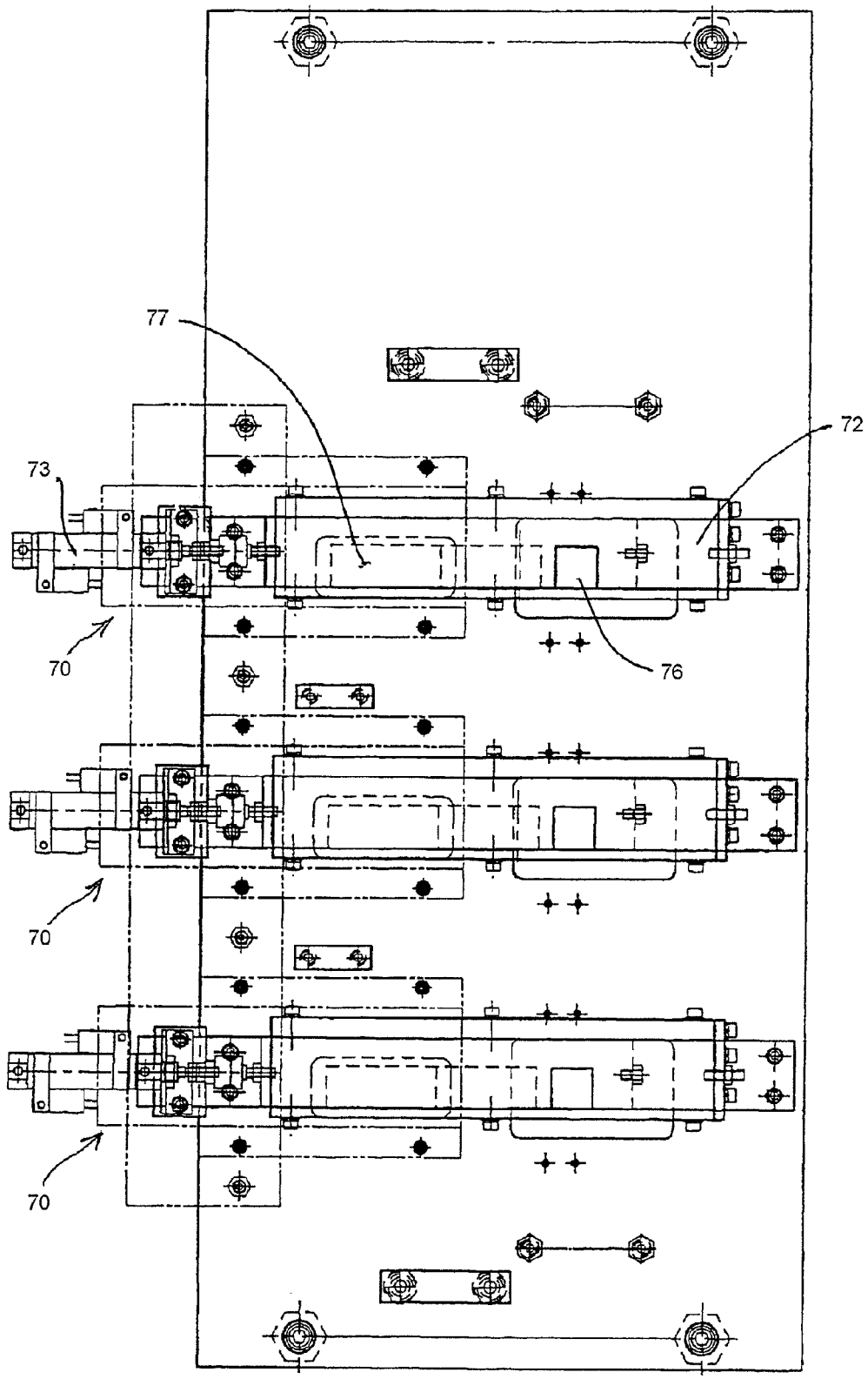
FIG. 14 A plane view of the defective evacuation unit shown in FIG. 13, which is drawn from the plane taken along G-G line shown in FIG. 13.

FIG. 13 is a lateral cross-sectional view of the defective evacuation unit 70, and FIG. 14 is a plan view of the defective evacuation unit 70, which is drawn from the plane indicated with arrows G-G shown in FIG. 13. Three defective evacuation units 70 are disposed at positions which locate at the backside relative to the IC tag passage connecting from the passage block 29 to a embedding unit described later such that they correspond to three passages 45, 46, 47 of the passage block 29, respectively. The defective evacuation unit 70 includes a defective evacuation member 72 which traverses the IC tag passage to move forward and backward, a defective evacuation cylinder unit 73 connected to one end of the defective evacuation member 72, and a defective evacuation chute 74 and a defective reception section 75, both are disposed at the lower level than the level of the defective evacuation member 72, in the front and back direction of the whole apparatus, more specifically in the direction parallel to the extending direction of the IC tag embedding hose described later.

The defective evacuation member 72 includes normal tag feeding passage 76 capable of aligning with the respective passages 45, 46, 47 of the passage block 29 and defective dropping pore 77 being adjacent to said feeding passage 76. In this example, the defective dropping pore 77 is formed at a position which is close to a defective evacuation cylinder unit 73 relative to the normal tag feeding passage 76 and includes a relatively wide opening, and the pore wall at the one side is formed as an inclined wall 77a, so that defectives can slide down thereon.

When the defectives of the wireless IC tags, such as data writing errors to the wireless IC tags, are detected by a defective detection sensor, the defective evacuation cylinder unit 73 is driven in response to the signal sent from the defective detection sensor. Then, each of the defective evacuation members 72 moves to slide so that the defective dropping pore 77 of the defective evacuation member 72 comes to a level lower than the level of the passage 45, 46, 47 of the passage block 29. As a result, the defective tags drop from the passage of the passage block 29 into the defective dropping pore 77, and rolling on the inclined wall 77a of the pore 77, and further fed from the defective evacuation chute 74 locating at lower level to the defective reception section 75 where the defective tags are received. When no detection signal is outputted from the detective detection sensor, the defective evacuation member 72 is caused to restore to the normal position by the defective evacuation cylinder unit 73 (the status shown in FIG. 13), and the normal tag feeding passage 76 in the defective evacuation member 72 come to be in a connected state with the passages 45, 46, 47 of the passage block 29 and the receiving passage 81 of the wireless IC tag embedding unit 80.

Figure 3:
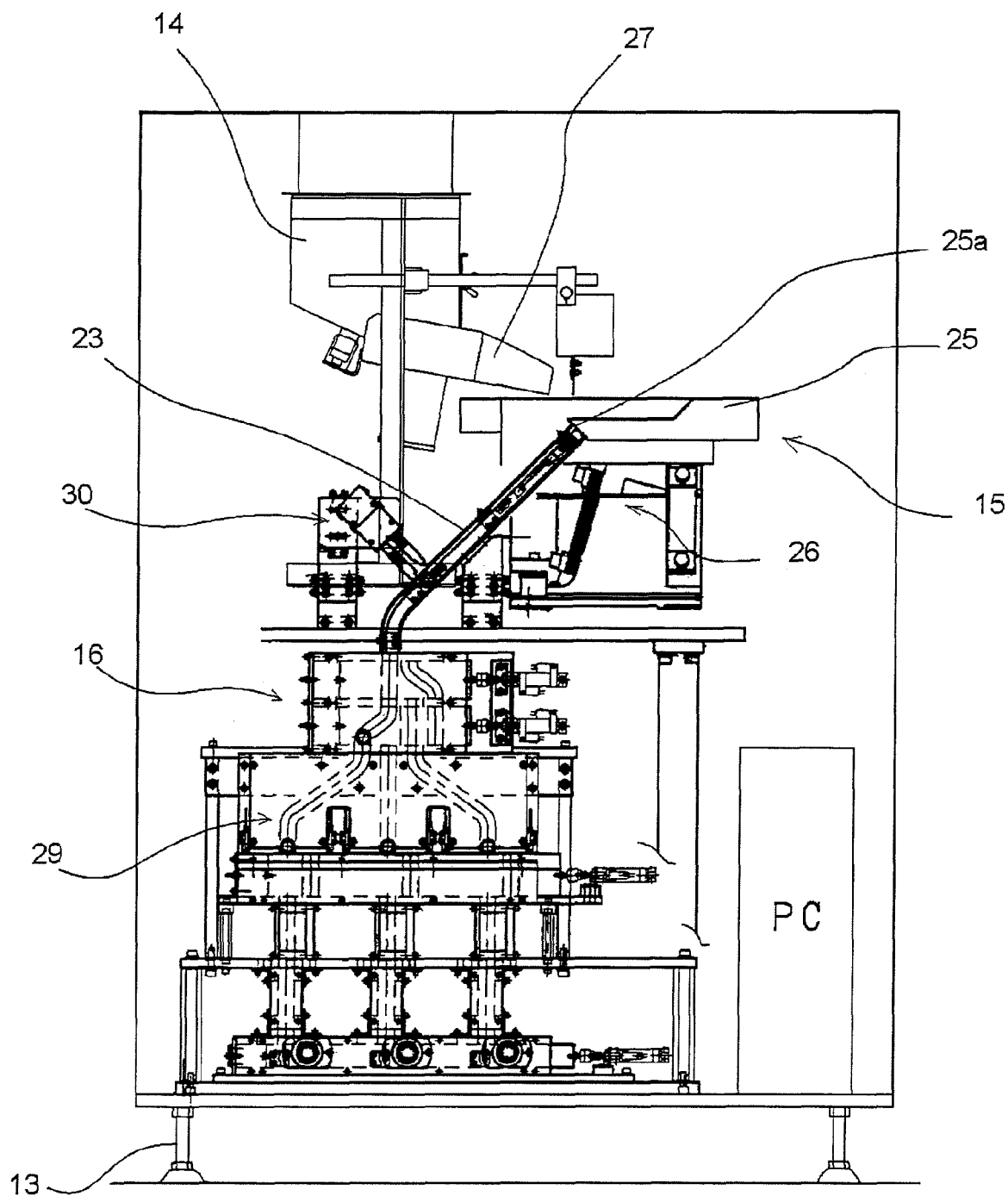
FIG. 3 A front view of a data processing and embedding apparatus for wireless IC tags according to an embodiment of the present invention.
Figure 15:
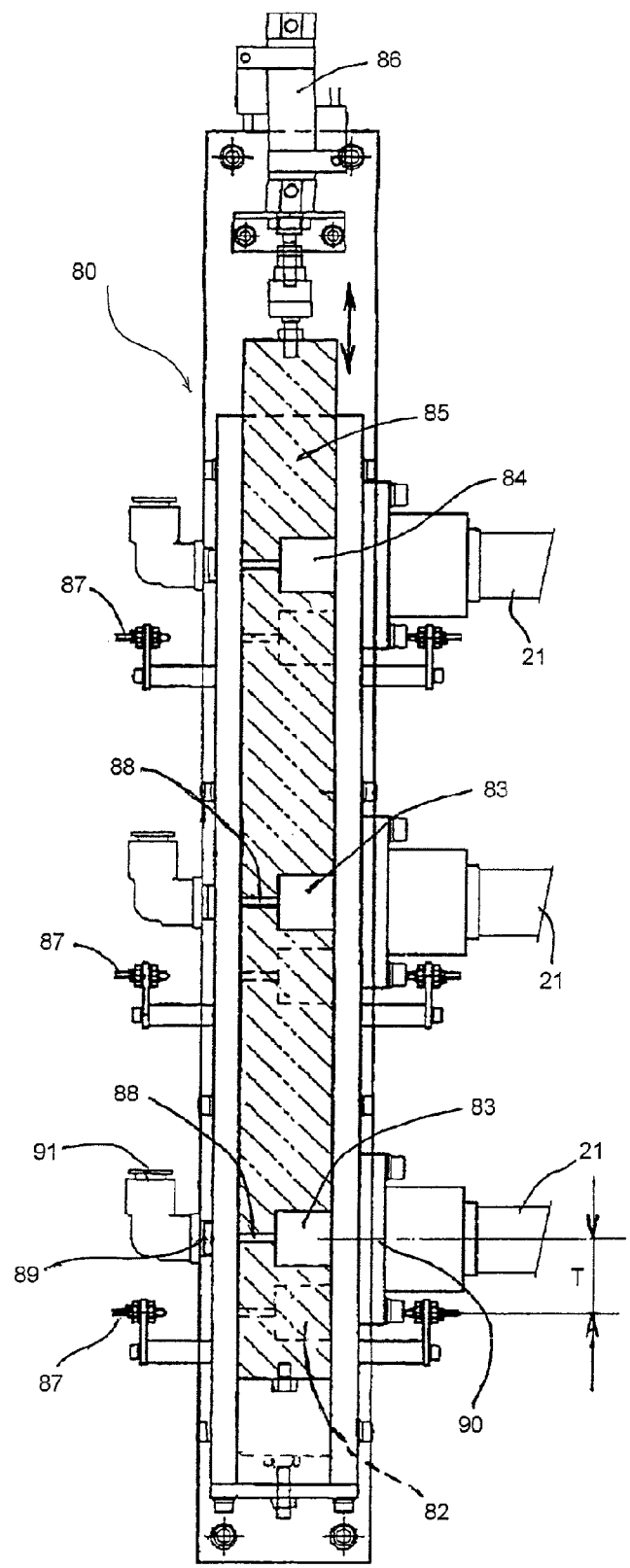
FIG. 15 A cross-sectional view of a wireless IC tag embedding unit according to an embodiment of the present invention, which is drawn from the top side, and is an enlarged sectional view taken along B-B line shown in FIG. 13.
Figure 16:
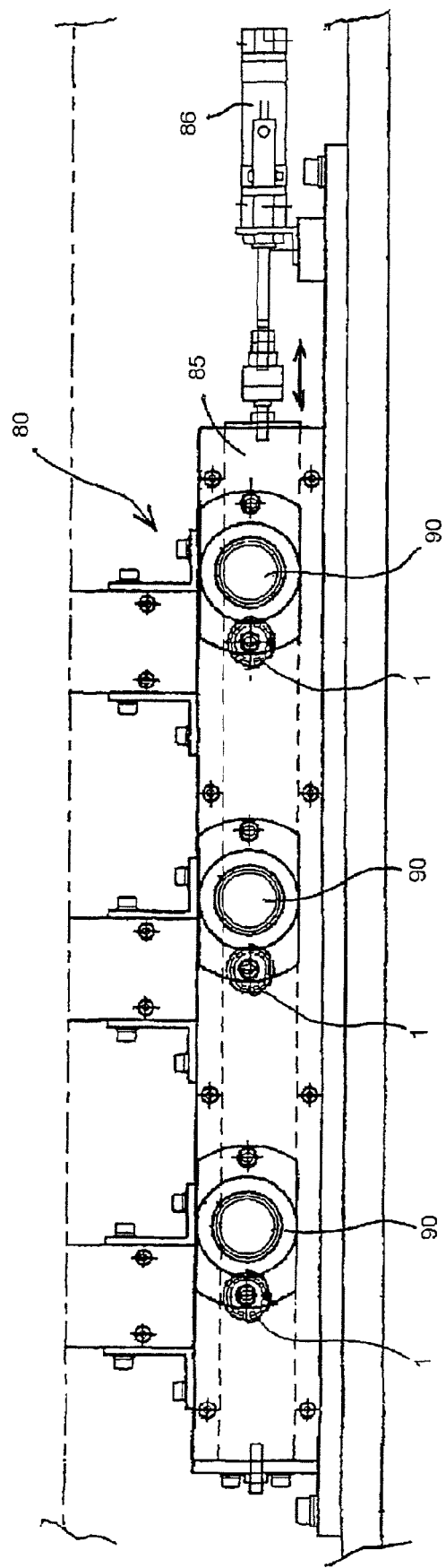
FIG. 16 A front view of a embedding unit according to an embodiment of the present invention, which is an enlarged view of the part D shown in FIG. 3.
Figure 17:
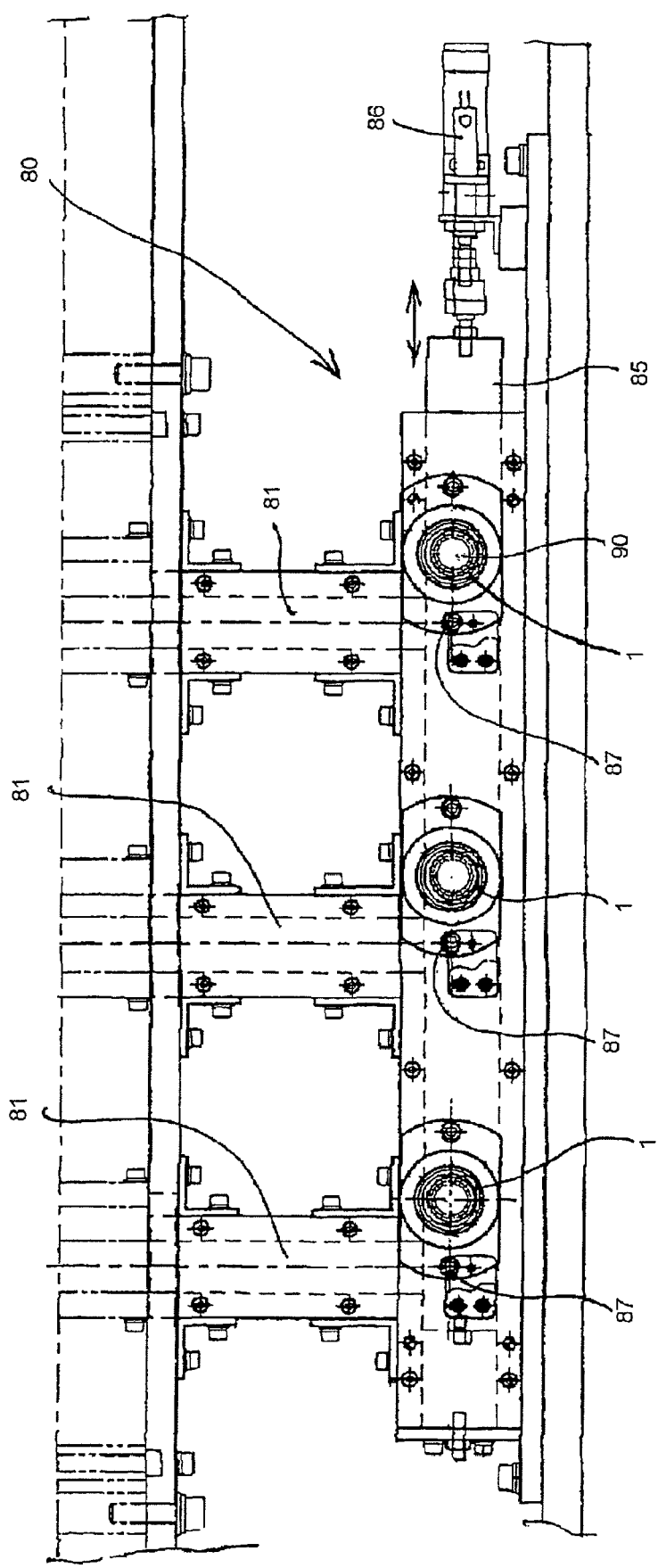
FIG. 17 An enlarged front view of a embedding unit according to an embodiment of the present invention, which is similar to that shown in FIG. 16.

FIG. 15 is a cross-sectional view drawn from the top side of a wireless IC tag charging unit 80, where the section taken along B-B line shown in FIG. 13 is enlarged. And FIG. 16 and FIG. 17 are front view of the wireless IC tag embedding unit 80, respectively, wherein the part D shown in FIG. 3 is enlarged. Note that FIG. 16 shows such a status that wireless IC tags have been received to the IC tag receiving concave of the charging unit 80, and FIG. 17 shows such a status that the wireless IC tags have moved to the position of the air hose. The wireless IC tag embedding unit 80 includes three IC tag reception passages 81 corresponding to the three passages of the passage block 29, and an elongated cutting member 85 including three IC tag receiving concaves 82, 83, 84 corresponding to the respective reception passage 81 is provided at a level lower than the level of the IC tag reception passage, so that it can move by sliding.

To one end of the cutting member 85, a cutting cylinder unit 86 for causing the cutting member 85 to reciprocate is connected. Further, the cutting member 85 is also provided with a sensor for detecting wireless IC tags 1 having had entered into the receiving concaves 82, 83, 84 under such a status that the IC tag receiving concaves 82, 83, 84 of the cutting member 85 are placed on the position where they have aligned with the respective IC tag reception passages 81 and a photoelectric sensor (a light emission element and a light emission sensor) 87 which bestrides the receiving concaves 82, 83, 84 in this example. Further, air ejection grooves (nozzles) 88 to be connected to the respective IC tag receiving concaves are provided to the cutting member 85 at each positions where the IC tag receiving concaves 82, 83, 84 of the cutting member 85 are located and at the back and rear sides of the IC tag receiving concaves 82, 83, 84

A pressured air ejection outlet 89 and an evacuation outlet 90 are provided such that the cutting member 85 is located therebetween with a preset spacing T in the longitudinal direction of the cutting member 85 relative to the respective IC tag receiving concaves 82, 83, 84 of the cutting member 85 locating at the IC tag receiving position. A feeding air tube 91 coupling with an air pump (not shown) is connected to the pressured air ejection outlet 89, and an air hose 21 is connected to the pressured air evacuation outlet 90. Note that the pressured air ejection outlet 89 is configured to connect with the air ejection groove (nozzle) 88 of the cutting member 85 that has slid to this position.

When the cutting member 85 is positioned such that the IC tag receiving concaves 82, 83, 84 of the cutting member 85 are positioned to align with the IC tag reception passage 81, the distribution unit and the wireless IC tags dropping from the passage block 29 are received to the wireless IC tag receiving concaves 82, 83, 84 of the cutting member 85 via the wireless IC tag reception passage 81. When the wireless IC tags are detected by a photoelectric sensor 87, the cutting cylinder unit 86 starts an operation in response to a detection signal to cause the cutting member 85 to slide over just a distance corresponding to its stroke T. As a result, the respective wireless IC tag receiving concaves 82, 83, 84 come to the position opposing to the pressured air ejection outlet 89 together with the wireless IC tags received in the IC tag receiving concaves 82, 83, 84. FIG. 17 shows the status at that time.

In the state as described above, the wireless IC tags 1 received in the wireless IC tag receiving concaves 82, 83, 84 are fed from the pressured air ejection outlet 89 to the pressured air evacuation outlet 90 and the air hose 21 by virtue of pressured air through the air ejection groove (nozzle) 88. As shown in FIG. 1, the air hose 21 has extended from data processing and charging apparatus for wireless IC tags according to this example and has inserted to the opening 22 which is formed in the top plate 12 of the mixing/kneading tank 11. The wireless IC tags 1 are embedded into unhardened concrete received in the tank 11. Note that, after the wireless IC tags in the wireless IC tag receiving concaves 82, 83, 84 are blown out, the cutting member 85 is returned again to the original position locating below the wireless IC tag reception passage 81 by the cutting cylinder unit 86. The cutting member 85 repeats the sliding action in order to repeat the above-described operations.

According to the apparatus of the present invention, contrary to the conventional method of embedding by spontaneous dropping utilizing the own weight of wireless IC tags, no trouble of blockade due to suction of dust into the embedding outlet occurs, even dust such as cement arises in association with the embedding of wireless IC tags and mixing/kneading, since pressured air is blown out from the air hose 21 together with the wireless IC tags. Further, though the data processing and embedding apparatus 10 for wireless IC tags according to this example is set over the mixing/kneading tank 11 in the illustrated example, it is not necessary to set the data processing and embedding apparatus over the mixing/kneading tank, and the apparatus of the invention may be placed on an appropriate location being distant from the tank, for example, on a position being several meters distant from the tank or in a controlled room, and the air hose 21 may be extended to connect with the mixing/kneading tank. Feeding of the IC tags can be done sufficiently even if the embedding apparatus is placed on a position being several meters distant from the object to be embedded.

According to this invention, it will be made possible to drastically reduce the trouble of blockade caused by the tags at the charging outlet and to freely select the place for placing the apparatus, by configuring the apparatus so that it employs the wireless IC tag embedding mechanism using pressured air and air hoses. Further, the data processing and embedding apparatus for wireless IC tags according to the present invention is not required to be placed to the same level as that of the mixing/kneading tank, and the apparatus may be placed directly on the ground to thereby secure the safeness of the apparatus and make the maintenance/checkout of the apparatus easier. Though three charging outlets for wireless IC tags and three air hoses are used in the example explained above, the present invention is not limited to this embodiment, and the required quantity may be decided arbitrarily as a matter of course, depending on the size of the mixing/kneading tank. Note that the pressure required for the pressured air is several atmospheric pressures.

In this invention, it is configured such that connecting/disconnecting of the power source for the data processing and embedding apparatus for wireless IC tags can be done remotely. Further, it can be made possible to carry out the operation of power source for the data processing and embedding apparatus through the Internet. Therefore, the operation of the data processing and embedding apparatus can be checked from any place other than the operation site, and even the case any trouble occurs, appropriate and prompt countermeasures can be taken.

It should be noted, although the conventional apparatuses are constituted in such a structure that any workers or operators can handle or carry out various units/operations as well as connecting of power source freely, the apparatus of the present invention it is configured to a system to perform those operations including data writing/reading based on ID input on the touch panel board. With this system, it is possible to limit the operators and operation competence to thereby raise compliance for the system management. Further, when the shape of the wireless IC tag to be embedded has been changed, for example, it was required to modify the whole apparatus in case of the conventional apparatuses. However, the apparatus of the present invention requires partial modification in order to deal with such change in the shape of the wireless IC tags.

Figure 19:
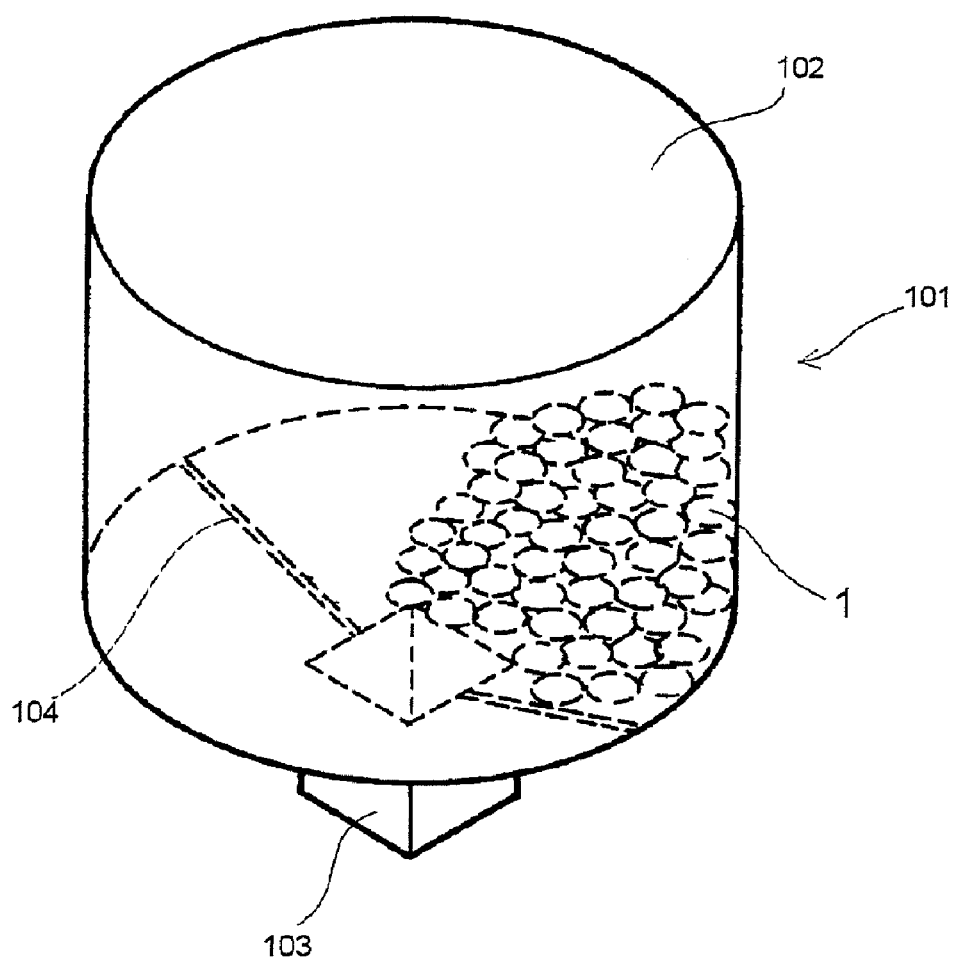
FIG. 19 A perspective view showing an example of a cartridge, which is applicable to an embodiment of the present invention.

Further, as shown in FIG. 19, the wireless IC tags 1 to be supplied to the hopper 14 may be supplied thereto in the form of a cartridge 101 in which the wireless IC tags have been contained in advance. A cartridge 101 containing wireless IC tags is attached to the opening of the hopper 14, and the wireless IC tags are supplied into the hopper 14. The inlet of the hopper 14 mounted to the data processing and embedding apparatus for wireless IC tags is formed in such a configuration that the cartridge 101 can be attached and detached freely.

The cartridge 101 comprises a cylindrical casing 102, in which a plurality of wireless IC tags which have not been written with data are contained. An opening 103 that fits to the inlet of the hopper 14 is formed in the bottom of the cartridge 101, and the wireless IC tags 1 are dropped through this opening 103. The bottom of the cartridge 101 is inclined to the opening 103, and a rail 104 guiding the wireless IC tags 1 to the opening 103 is formed in the bottom. Note that the above-mentioned shape of the cartridge 101 is just an example, and the shape of the cartridge 101 is not limited to this example.

When wireless IC tags in the hopper 14 are near empty, the wireless IC tags 1 can be supplied easily by replacing the used cartridge 101 with new one which is filled with wireless IC tags with no data. Further, by supplying wireless IC tags 1 into a cartridge 101 and then enclosing the cartridge, the other wireless IC tags may be prevented from being embedded, and embedding of falsified wireless IC tags and the like may be prevented as well. Consequently, the quality management system for concrete using wireless IC tags having been written with correct data can be achieved.

The data processing and embedding apparatus for wireless IC tags according to the present invention is configured to include a vibration/alignment unit for aligning wireless IC tags in the same direction by applying vibrating force, a distribution unit for distributing the wireless IC tags having been fed in an aligned state to plural passages, a radio communication unit for performing data writing and/or reading to/from the distributed wireless IC tags through radio communication, and a wireless IC tag embedding unit for charging the wireless IC tags to/from which data has been written/read to an object to be embedded with wireless IC tags by applying air pressure. With the data processing and embedding apparatus so configured, the directivity of the IC tags at the writing/reading position is made steady by alignment mean for wireless IC tags, which leads to reduction of information writing errors. Furthermore, contrary to the conventional apparatus, the embedding of wireless IC tags in this invention is not carried out by spontaneous dropping of IC tags from the charging inlet, the place for setting the apparatus may be selected flexibly, appearance of dust from the object to be embedded can be prevented from occurring, and blockade at the tip of the embedding inlet caused by dust can be reduced drastically.

What is claimed is:
1. An apparatus for embedding wireless IC tags comprising:

an alignment unit for aligning the wireless IC tags in the same direction by applying a vibrating force to the wireless IC tags;

a distribution unit for distributing the wireless IC tags aligned by the alignment unit to a plurality of passages, the wireless IC tags aligned by the alignment unit having been fed from the alignment unit to the distribution unit;

a radio communication unit for performing, through radio communication, data writing and/or reading to/from the wireless IC tags distributed by the distribution unit to the plurality of passages; and a wireless IC tag embedding unit for embedding the wireless IC tags to/from which data has been written/read into an object to be embedded with wireless IC tags by applying air pressure to the wireless IC tags to/from which data has been written/read.

2. The apparatus for embedding wireless IC tags according to claim 1, wherein the object to be embedded with wireless IC tags is (i) a material which can retain the state of liquid, viscous or semisolid and (ii) provided in a mixing/kneading tank prior to the wireless IC tags to/from which data has been written/read are embedded into the object to be embedded with wireless IC tags.

3. The apparatus for embedding wireless IC tags according to claim 2, wherein the alignment unit includes:
a concave disc for receiving the wireless IC tags;
a round-shaped feeding path being formed on the periphery of the concave disc;
a vibration-applying drive member for applying the vibrating force to the concave disc and the round-shaped feeding path, and
wherein the round-shaped feeding path includes (i) at one end of the round-shaped feeding path, an IC tag intake connecting to the concave disc and (ii) at the other end of the round-shaped feeding path, an evacuation outlet connecting to an IC tag dropping chute.

4. The apparatus for embedding wireless IC tags according to claim 1, wherein the object to be embedded with wireless IC tags is (i) unhardened concrete prepared by mixing/kneading cement, water and aggregate and (ii) provided in a mixing/kneading tank prior to the wireless IC tags to/from which data has been written/read are embedded into the object to be embedded with wireless IC tags.

5. The apparatus for embedding wireless IC tags according to claim 4, wherein the alignment unit includes:
a concave disc for receiving the wireless IC tags;
a round-shaped feeding path being formed on the periphery of the concave disc;
a vibration-applying drive member for applying the vibrating force to the concave disc and the round-shaped feeding path, and
wherein the round-shaped feeding path includes (i) at one end of the round-shaped feeding path, an IC tag intake connecting to the concave disc and (ii) at the other end of the round-shaped feeding path, an evacuation outlet connecting to an IC tag dropping chute.

6. The apparatus for embedding wireless IC tags according to claim 1, wherein the alignment unit includes:
a concave disc for receiving the wireless IC tags;
a round-shaped feeding path being formed on the periphery of the concave disc;
a vibration-applying drive member for applying the vibrating force to the concave disc and the round-shaped feeding path, and
wherein round-shaped feeding path includes (i) at one end of the round-shaped feeding path, an IC tag intake connecting to the concave disc and (ii) at the other end the round-shaped feeding path, an evacuation outlet connecting to an IC tag dropping chute.

7. The apparatus for embedding wireless IC tags according to claim 6, wherein the IC tag dropping chute is disposed between the evacuation outlet of the alignment unit and the distribution unit to connect the evacuation outlet and the distribution unit,
wherein the IC tag dropping chute is provided with (i) a stopper for temporarily stopping wireless IC tags dropping through the IC tag dropping chute and (ii) a sensor for detecting the temporary stop of the wireless IC tags, and
wherein the stopper is released in response to a detection signal from the sensor to thereby feed the temporary stopped wireless IC tags one by one to the distribution unit.

8. The apparatus for embedding wireless IC tags according to claim 6, wherein a measuring means for counting the number of wireless IC tags passing through the IC tag dropping chute is provided to the IC tag dropping chute.

9. The apparatus for embedding wireless IC tags according to claim 6, wherein the distribution unit includes:
a first slider including at least one passage capable of aligning with the IC tag dropping chute;
a second slider including a plurality of passages capable of aligning with the at least one passage of the first slider; and
a cylinder unit for moving the first slider and the second slider so that (i) the at least one passage of the first slider is aligned with any one of the plurality of passages of the second slider and (ii) the at least one passage of the first slider is not aligned with the remaining passages of the plurality of passage of the second slider.

10. The apparatus for embedding wireless IC tags according to claim 1, further comprising:

a passage block including a plurality of IC tag passages; and
a passage opening/closing unit for opening/closing each of the plurality of IC tag passages,
wherein the passage block is disposed between the distribution unit and the wireless IC tag embedding unit,
wherein the passage opening/closing unit is disposed between the passage block and the wireless IC tag embedding unit,
wherein the radio communication unit is disposed relative to each of the plurality of IC tag passages of the passage so that the radio communication unit opposes the passage block, and
wherein the passage opening/closing unit stops wireless IC tags in the plurality of IC tag passages of the passage block so that data writing or reading to the wireless IC tags stopped in the plurality of IC tag passages of the passage block is performed by the radio communication unit.

11. The apparatus for embedding wireless IC tags according to claim 10, further comprising a defective evacuation unit disposed between the passage opening/closing unit and the IC wireless tag embedding unit, the defective evacuation unit including (i) a defective evacuation member capable of sliding, (ii) a defective dropping pore, (iii) normal tag feeding passage, and (iv) a sliding drive section for sliding the defective evacuation member, wherein, when a signal is received from a defective detection section for detecting defective wireless IC tags, the sliding drive section slides the defective evacuation member so that the defective dropping pore is aligned with the plurality of IC tag passages of the passage block, and wherein, when no signal is received from the defective detection section, the sliding drive section slides the defective evacuation member so that the normal tag feeding passage is aligned with the plurality of IC tag passages of the passage block.

12. The apparatus for embedding wireless IC tags according to claim 11,
wherein the wireless IC tag embedding unit includes:
an IC tag reception passage connecting to the normal tag feeding passage of the defective evacuation member;
a cutting member provided with IC tag receiving concaves and capable of sliding; and
a pressured air feeding/evacuating section disposed so as to be laterally distant from the position of the IC tag reception passage,
wherein the cutting member is driven to slide so that the IC tag receiving concaves reciprocate between the position of the IC tag reception passage and the position of the pressured air feeding/evacuating section, and
wherein wireless IC tags in the receiving concaves are embedded into the object to be embedded with wireless IC tags by applying pressured air at the position of the pressured air feeding/evacuating section.

13. The apparatus for embedding wireless IC tags according to claim 12,
wherein a hose for embedding the wireless IC tags in the receiving concaves into the object to be embedded with wireless IC tags is connected to the pressured air feeding/evacuating section.

14. The apparatus for embedding wireless IC tags according to claim 1, further comprising
a remotely-operable apparatus-actuating power source for connecting/disconnecting a power source to the apparatus for embedding wireless IC tags to control an operation status of the apparatus for embedding wireless IC tags so that the operation status of the apparatus for embedding wireless IC tags can be remotely operated.

15. The apparatus for embedding wireless IC tags according to claim 14,
wherein, using the apparatus-actuating power source, the operation status of the apparatus for embedding wireless IC tags can be operated based on ID input from a touch panel device.

16. The apparatus for embedding wireless IC tags according to claim 1,
wherein the radio communication unit is a non-contact type radio communication unit which is electrically connected with a database in a wired or a wireless manner,
wherein the radio communication unit outputs radio waves of a preset frequency band to carry out radio communication to antenna sections of the wireless IC tags, thereby writing product information data being stored in the database to the wireless IC tags.

17. The apparatus for embedding wireless IC tags according to claim 1,
wherein each of the wireless IC tags includes a substrate and a wireless IC tag chip mounted on the substrate, and
wherein the wireless IC tag chip includes:
a power source section for receiving radio waves from the radio communication unit and resonating with those radio waves to generate current;
an antenna section for carrying out radio communication at a preset frequency band; and
a ferroelectric memory for storing data received during the radio communication at the preset frequency band.

18. The apparatus for embedding wireless IC tags according to claim 1,
wherein each of the wireless IC tags (i) has a ball-like shape with a pair of convex end faces, (ii) is symmetric relative to an axis passing through the center of both of the pair of convex end faces and (iii) is capable of freely rolling, and
wherein radio communication for data writing or reading to/from each of the wireless IC tags is received from a direction opposing one of the pair of convex end faces.

19. The apparatus for embedding wireless IC tags according to claim 1,
wherein the alignment unit is configured so that it includes an opening into which a cartridge including the wireless IC tags can be attached.

* * * * *